US00RE50743E

(19) United States
(12) Reissued Patent
Wala et al.

(10) Patent Number: US RE50,743 E
(45) Date of Reissued Patent: Jan. 6, 2026

(54) MODULAR WIRELESS COMMUNICATIONS PLATFORM

(71) Applicant: Outdoor Wireless Networks LLC, Claremont, NC (US)

(72) Inventors: Philip M. Wala, Savage, MN (US); Robert J. Koziy, Burnsville, MN (US); Dean Zavadsky, Shakopee, MN (US)

(73) Assignee: Outdoor Wireless Networks LLC, Richardson, TX (US)

(21) Appl. No.: 17/591,497

(22) Filed: Feb. 2, 2022

Related U.S. Patent Documents

Reissue of:
(64) Patent No.: 10,554,242
Issued: Feb. 4, 2020
Appl. No.: 15/948,707
Filed: Apr. 9, 2018

U.S. Applications:
(63) Continuation of application No. 15/444,134, filed on Feb. 27, 2017, now Pat. No. 9,941,921, which is a continuation of application No. 13/335,128, filed on Dec. 22, 2011, now Pat. No. 9,585,193, which is a (Continued)

(51) Int. Cl.
*H04B 1/18* (2006.01)
*H04B 1/40* (2015.01)
*H04W 88/08* (2009.01)

(52) U.S. Cl.
CPC ..... *H04B 1/18* (2013.01); *H04B 1/40* (2013.01); *H04W 88/085* (2013.01)

(58) Field of Classification Search
CPC ..... H04B 1/18; H04B 1/40; H04W 88/085
See application file for complete search history.

(56) References Cited

U.S. PATENT DOCUMENTS 3,931,473 A 1/1976 Ferris, Jr.
4,101,834 A 7/1978 Stutt et al.
4,112,488 A 9/1978 Smith, III (Continued)

FOREIGN PATENT DOCUMENTS

CA 2008900 1/1998
DE 3707244 A1 9/1988

(Continued)

OTHER PUBLICATIONS

"Vehicular Technology Society 42nd VTS Conference Frontiers of Technology", Pioneers to the 21st Century, May 1992, pp. 1-5.

(Continued)

*Primary Examiner* — Eron J Sorrell
(74) *Attorney, Agent, or Firm* — Fogg & Powers LLC

(57) ABSTRACT

A modular wireless communications platform is provided. The modular wireless communications platform has a modular host unit and a modular remote unit in communication with the modular host unit. The modular host unit and remote unit include a serial radio frequency communicator configured to convert serial digital data into RF sampled data and configured to convert RF sampled data into serial digital data. The modular host unit and remote unit also include an interface coupled to the serial radio frequency communicator and configured to allow transfer of the RF sampled data from the serial radio frequency communicator to a digital to analog radio frequency transceiver module.

34 Claims, 9 Drawing Sheets

Related U.S. Application Data continuation of application No. 11/627,251, filed on Jan. 25, 2007, now Pat. No. 8,737,454.

(56) References Cited

U.S. PATENT DOCUMENTS 4,144,409 A 3/1979 Utano et al.
4,144,411 A 3/1979 Frenkiel
4,183,054 A 1/1980 Patisaul et al.
4,231,116 A 10/1980 Sekiguchi et al.
4,244,046 A 1/1981 Brouard et al.
4,354,167 A 10/1982 Terreault et al.
4,402,076 A 8/1983 Krajewski
4,451,699 A 5/1984 Gruenberg
4,451,916 A 5/1984 Casper et al.
4,456,793 A 6/1984 Baker et al.
4,475,010 A 10/1984 Huensch et al.
4,485,486 A 11/1984 Webb et al.
4,525,861 A 6/1985 Freeburg
4,531,239 A 7/1985 Usui
4,556,760 A 12/1985 Goldman
4,596,051 A 6/1986 Feldman
4,611,323 A 9/1986 Hessenmuller
4,613,990 A 9/1986 Halpern
4,628,501 A 12/1986 Loscoe
4,654,843 A 3/1987 Roza et al.
4,667,319 A 5/1987 Chum
4,669,107 A 5/1987 Eriksson-Lennartsson
4,691,292 A 9/1987 Rothweiler
4,701,909 A 10/1987 Kavehrad et al.
4,704,733 A 11/1987 Kawano
4,718,004 A 1/1988 Dalal
4,754,451 A 6/1988 Eng et al.
4,759,051 A 7/1988 Han
4,760,573 A 7/1988 Calvignac et al.
4,790,000 A 12/1988 Kinoshita
4,794,649 A 12/1988 Fujiwara
4,797,947 A 1/1989 Labedz
4,816,825 A 3/1989 Chan et al.
4,831,662 A 5/1989 Kuhn
4,849,963 A 7/1989 Kawano et al.
4,916,460 A 4/1990 Powell
4,920,533 A 4/1990 Dufresne et al.
4,932,049 A 6/1990 Lee
4,959,829 A 9/1990 Griesing
4,977,593 A 12/1990 Ballance
4,999,831 A 3/1991 Grace
5,067,147 A 11/1991 Lee
5,067,173 A 11/1991 Gordon et al.
5,084,869 A 1/1992 Russell
5,136,410 A 8/1992 Heiling et al.
5,138,440 A 8/1992 Radice
5,159,479 A 10/1992 Takagi
5,175,867 A 12/1992 Wejke et al.
5,193,109 A 3/1993 Chien-Yeh
5,243,598 A 9/1993 Lee
5,251,053 A 10/1993 Heidemann
5,267,261 A 11/1993 Blakeney, II et al.
5,272,700 A 12/1993 Hansen et al.
5,278,690 A 1/1994 Vella-Coleiro
5,280,472 A 1/1994 Gilhousen et al.
5,285,469 A 2/1994 Vanderpool
5,297,193 A 3/1994 Bouix et al.
5,299,198 A 3/1994 Kay et al.
5,301,056 A 4/1994 O'Neill
5,303,287 A 4/1994 Laborde
5,303,289 A 4/1994 Quinn
5,305,308 A 4/1994 English et al.
5,309,474 A 5/1994 Gilhousen et al.
5,313,461 A 5/1994 Ahl et al.
5,321,736 A 6/1994 Beasley
5,321,849 A 6/1994 Lemson
5,339,184 A 8/1994 Tang
5,381,459 A 1/1995 Lappington
5,392,453 A 2/1995 Gudmundson et al.
5,400,391 A 3/1995 Emura et al.
5,442,700 A 8/1995 Snell et al.
5,461,627 A 10/1995 Rypinski
5,519,691 A 5/1996 Darcie et al.
5,545,397 A 8/1996 Spielvogel et al.
5,566,168 A 10/1996 Dent
5,577,029 A 11/1996 Lu et al.
5,586,121 A 12/1996 Moura et al.
5,587,734 A 12/1996 Lauder et al.
5,603,080 A 2/1997 Kallander et al.
5,621,786 A 4/1997 Fischer et al.
5,627,679 A 5/1997 Iba
5,627,879 A 5/1997 Russell et al.
5,631,916 A 5/1997 Georges et al.
5,642,405 A 6/1997 Fischer et al.
5,644,622 A 7/1997 Russell et al.
5,657,374 A 8/1997 Russell et al.
5,668,562 A 9/1997 Cutrer et al.
5,682,256 A 10/1997 Motley et al.
5,682,403 A 10/1997 Tu et al.
5,708,961 A 1/1998 Hylton et al.
D391,967 S 3/1998 Blais et al.
D391,968 S 3/1998 Shiozaki
5,732,076 A 3/1998 Ketseoglou et al.
5,734,699 A 3/1998 Lu et al.
5,734,979 A 3/1998 Lu et al.
5,761,195 A 6/1998 Lu et al.
5,761,619 A 6/1998 Danne et al.
5,765,097 A 6/1998 Dail
5,765,099 A 6/1998 Georges et al.
5,774,789 A 6/1998 van der Kaay et al.
5,781,541 A 7/1998 Schneider
5,781,582 A 7/1998 Sage et al.
5,781,859 A 7/1998 Beasley
D397,693 S 9/1998 Blais et al.
5,802,173 A 9/1998 Hamilton-Piercy et al.
5,805,983 A 9/1998 Naidu et al.
5,809,395 A 9/1998 Hamilton-Piercy et al.
5,818,824 A 10/1998 Lu et al.
5,822,324 A 10/1998 Kostresti et al.
5,842,138 A 11/1998 Lu et al.
5,852,651 A 12/1998 Fischer et al.
5,867,535 A 2/1999 Phillips et al.
5,878,325 A 3/1999 Dail
5,883,882 A 3/1999 Schwartz
5,887,256 A 3/1999 Lu et al.
5,890,055 A * 3/1999 Chu ..... H04B 7/2606 455/16
5,907,544 A 5/1999 Rypinski
5,930,682 A 7/1999 Schwartz et al.
5,946,622 A 8/1999 Bojeryd
5,953,651 A 9/1999 Lu et al.
5,969,837 A 10/1999 Farber et al.
5,983,070 A 11/1999 Georges et al.
5,987,014 A 11/1999 Magill et al.
5,999,813 A 12/1999 Lu et al.
6,005,884 A 12/1999 Cook et al.
6,014,546 A 1/2000 Georges et al.
6,034,950 A 3/2000 Sauer et al.
6,078,823 A 6/2000 Chavez et al.
6,081,716 A 6/2000 Lu
6,101,400 A 8/2000 Ogaz et al.
6,108,113 A 8/2000 Fee
6,108,550 A 8/2000 Wiorek et al.
6,108,626 A 8/2000 Cellario et al.
6,112,086 A 8/2000 Wala
6,147,786 A 11/2000 Pan
6,157,659 A 12/2000 Bird
6,157,810 A 12/2000 Georges et al.
6,169,907 B1 1/2001 Chang et al.
6,173,177 B1 1/2001 Lu et al.
6,181,687 B1 1/2001 Bisdikian
6,188,693 B1 2/2001 Murakami
6,192,216 B1 2/2001 Sabat, Jr. et al.
6,198,558 B1 3/2001 Graves et al.
6,212,395 B1 4/2001 Lu et al.
6,222,660 B1 4/2001 Traa
6,226,274 B1 5/2001 Reese et al.
6,262,981 B1 7/2001 Schmutz
6,269,255 B1 7/2001 Waylett

(56) References Cited

U.S. PATENT DOCUMENTS 6,275,990 B1 8/2001 Dapper et al.
6,317,884 B1 11/2001 Eames et al.
6,337,754 B1 1/2002 Imajo
6,353,600 B1 3/2002 Schwartz et al.
6,362,908 B1 3/2002 Kimbrough et al.
6,373,887 B1 4/2002 Aiyagari et al.
6,374,124 B1 4/2002 Slabinski
6,377,640 B2 4/2002 Trans
6,381,463 B1 4/2002 Tu et al.
6,466,572 B1 10/2002 Ethridge et al.
6,480,551 B1 11/2002 Ohishi et al.
6,486,907 B1 11/2002 Farber et al.
6,498,936 B1 12/2002 Raith
6,535,732 B1 3/2003 McIntosh et al.
6,549,772 B1 4/2003 Chavez et al.
6,553,111 B1 4/2003 Wang
6,556,551 B1 4/2003 Schwartz
6,567,473 B1 5/2003 Tzannes
6,580,924 B1 6/2003 Lu et al.
6,594,496 B2 7/2003 Schwartz
6,597,912 B1 7/2003 Lu et al.
6,640,108 B2 10/2003 Lu et al.
6,658,259 B2 12/2003 McIntosh
6,667,973 B1 12/2003 Gorshe et al.
6,675,004 B1 1/2004 Waylett
6,694,134 B1 2/2004 Lu et al.
6,697,603 B1 2/2004 Lovinggood et al.
6,729,929 B1 5/2004 Sayers et al.
6,768,745 B1 7/2004 Gorshe et al.
6,771,933 B1 8/2004 Eng et al.
6,785,558 B1 8/2004 Stratford et al.
6,801,767 B1 10/2004 Schwartz et al.
6,826,163 B2 11/2004 Mani et al.
6,826,164 B2 11/2004 Mani et al.
6,829,477 B1 12/2004 Lu et al.
6,831,901 B2 12/2004 Millar
6,847,653 B1 1/2005 Smiroldo
6,907,048 B1 6/2005 Treadaway et al.
6,912,409 B2 6/2005 Waylett
6,917,614 B1 7/2005 Laubach et al.
6,931,261 B2 8/2005 Waylett et al.
6,963,552 B2 11/2005 Sabat, Jr. et al.
6,967,966 B1 11/2005 Donohue
7,016,308 B1 3/2006 Gallagher
7,031,335 B1 4/2006 Donohue et al.
7,035,671 B2 4/2006 Solum
7,127,175 B2 10/2006 Mani et al.
7,205,864 B2 4/2007 Schultz, Jr. et al.
7,215,651 B2 5/2007 Millar
7,634,250 B1 * 12/2009 Prasad ..... H04W 88/085 455/21
7,826,507 B2 * 11/2010 Nishiguchi ..... H01S 5/028 372/49.01
8,583,100 B2 11/2013 Koziy et al.
8,737,454 B2 5/2014 Wala et al.
9,585,193 B2 2/2017 Wala et al.
9,941,921 B2 4/2018 Wala et al.
10,554,242 B2 2/2020 Wala et al.
2001/0033555 A1 * 10/2001 Kim ..... H04W 88/08 370/328
2002/0027892 A1 3/2002 Sasaki
2002/0167954 A1 11/2002 Highsmith et al.
2002/0191565 A1 12/2002 Mani et al.
2003/0015943 A1 1/2003 Kim et al.
2003/0040335 A1 2/2003 McIntosh et al.
2003/0043928 A1 3/2003 Ling et al.
2003/0143947 A1 7/2003 Lyu
2004/0008737 A1 1/2004 McClellan
2004/0010609 A1 1/2004 Vilander et al.
2004/0037565 A1 2/2004 Young et al.
2004/0062214 A1 * 4/2004 Schnack ..... H04B 7/2606 370/315
2004/0100930 A1 * 5/2004 Shapira ..... H01Q 1/007 370/338
2004/0106435 A1 6/2004 Bauman et al.
2004/0110534 A1 6/2004 Chung et al.
2004/0166898 A1 8/2004 Tajima
2004/0196834 A1 10/2004 Ofek et al.
2004/0198453 A1 10/2004 Cutrer et al.
2004/0204105 A1 * 10/2004 Liang ..... H04B 7/0608 455/562.1
2005/0084076 A1 4/2005 Dhir et al.
2005/0088999 A1 4/2005 Waylett et al.
2005/0147067 A1 7/2005 Mani et al.
2005/0153712 A1 7/2005 Osaka et al.
2005/0172198 A1 8/2005 Millar
2005/0201323 A1 9/2005 Mani et al.
2005/0243785 A1 * 11/2005 Sabat, Jr. ..... H04W 16/14 370/338
2005/0250503 A1 11/2005 Cutrer
2005/0288060 A1 * 12/2005 Kojima ..... H04W 88/085 455/561
2006/0026017 A1 2/2006 Walker
2006/0029171 A1 2/2006 Jensen
2006/0040615 A1 2/2006 Mohamadi
2006/0111047 A1 5/2006 Louberg et al.
2006/0128347 A1 6/2006 Piriyapoksombut et al.
2006/0209752 A1 * 9/2006 Wijngaarden ..... H04W 28/06 370/328
2006/0221905 A1 * 10/2006 Behzad ..... H04B 1/40 370/335
2006/0283952 A1 12/2006 Wang
2007/0008939 A1 1/2007 Fischer
2007/0091896 A1 * 4/2007 Liu ..... H04J 3/1617 370/395.5
2007/0127383 A1 6/2007 Borella
2007/0147278 A1 * 6/2007 Millar ..... H04J 3/047 370/315
2007/0243899 A1 * 10/2007 Hermel ..... H04W 16/26 455/553.1
2007/0274279 A1 11/2007 Wood et al.
2008/0014948 A1 1/2008 Scheinert
2008/0058018 A1 3/2008 Scheinert
2008/0171569 A1 * 7/2008 Pralle ..... H04B 1/74 455/524
2008/0267142 A1 10/2008 Mushkin et al.
2009/0129314 A1 5/2009 Weniger et al.

FOREIGN PATENT DOCUMENTS

EP 0166885 A2 1/1986
EP 0346925 A2 12/1989
EP 0368673 A1 5/1990
EP 0391597 A2 10/1990
EP 0468688 A2 1/1992
EP 0664621 A1 7/1995
EP 0876073 A2 11/1998
EP 1739871 A2 1/2007
FR 2345865 A1 10/1977
GB 2253770 A 9/1992
GB 2289198 A 11/1995
GB 2315959 A 2/1998
GB 2320653 A 6/1998
GB 2347319 A 8/2000
GB 2386037 A 9/2003
JP 58164007 A 9/1983
JP S58164007 A 9/1983
JP 326031 A 2/1991
JP H0326031 A 2/1991
JP 512374 1/1993
JP 512374 A 1/1993
WO 9115927 A1 10/1991
WO 9533350 A1 12/1995
WO 9628946 A1 9/1996
WO 9716000 A1 5/1997
WO 9732442 A1 9/1997
WO 9824256 A2 6/1998
WO 9909769 A1 2/1999
WO 9937035 A1 7/1999
WO WO-0137590 A1 * 5/2001 ..... H04B 7/15
WO 0174013 A2 10/2001
WO 0174100 A1 10/2001

(56) References Cited

FOREIGN PATENT DOCUMENTS

| | | | |
|---|---|---|---|
| WO | 03079645 | A2 | 9/2003 |
| WO | 2004006602 | A1 | 1/2004 |
| WO | 2005122696 | A2 | 12/2005 |

OTHER PUBLICATIONS

Cox, et al., "A Radio System Proposal for Widespread Low-Power Tetherless Communications", IEEE Transactions on Communications, Feb. 1991, pp. 324-335, vol. 39, No. 2, IEEE.
European Patent Office, "Communication pursuant to Article 94(3) EPC from EP Application No. 18204572.4", from Foreign Counterpart to U.S. Appl. No. 11/627,251, filed Jan. 11, 2021, pp. 1 through 5, Published: EP.
Fogg and Powers, LLC, "312 Amendment", U.S. Appl. No. 11/627,251, filed Apr. 7, 2014, pp. 1-12, Published: US.
Foxcom Wireless Propriety Information, "Litenna In-Building RF Distribution System", White Paper Document No. 12-14-001-09C, 1998, pp. 1-8, Foxcom Wireless.
GTE Laboratories, "Urban Microcell System Layout", GTE Laboratories Conference, Jun. 14-18, 1992, pp. 1-13.
International Bureau, "Notification Concerning Transmittal of International Preliminary Report on Patentability from PCT Application No. PCT/US2008/052023 dated Aug. 6, 2009", from Foreign Counterpart to U.S. Appl. No. 11/627,251, Aug. 6, 2009, pp. 1-5, Published: Switzerland.
Ishio et al., "A Two-Way Wavelength-Division-Multiplexing Transmission and its Application to a Switched TV-Distribution System", Conference Record, Fourth European Conference on Optical Communication, Sep. 12, 1978, pp. 645-665, Publisher: IIC.
Korean Patent Office, "Office Action from KR Application No. 10-2009-7017365 dated Apr. 23, 2014", from Foreign Counterpart to U.S. Appl. No. 11/627,251, Apr. 23, 2014, pp. 1-2, Published: KR.
Korean Patent Office, "Office Action from KR Application No. 10-2009-7017365 dated Sep. 17, 2014", from Foreign Counterpart to U.S. Appl. No. 11/627,251, Sep. 16, 2014, pp. 1-6, Published: KR.
Korean Patent Office, "Office Action from KR Application No. 10-2014-7017281 dated Sep. 19, 2014", from Foreign Counterpart to U.S. Appl. No. 11/627,251, Sep. 19, 2014, pp. 1-4, Published: KR.
Nakatsugawa, et al., "Software Radio Base and Personal Stations for Cellular/PCS Systems", Vehicular Technology Conference Proceedings, May 18, 2000, pp. 617-621, Publisher: IEEE.
Russell, "New Microcell Technology Sets Cellular Carriers Free", Telephony, Mar. 1993, pp. 40, 42, and 46.
State Intellectual Property Office, P.R. China, "First Office Action from CN Application No. 20080006156.3 dated Jan. 18, 2012", from Foreign Counterpart to U.S. Appl. No. 11/627,251, pp. 1-13, Published: CN.
State Intellectual Property Office, P.R. China, "First Office Action from CN Application No. 201310074263.2 dated Feb. 13, 2015", from Foreign Counterpart to U.S. Appl. No. 11/627,251, Feb. 13, 2015, pp. 1-13, Published: CN.
Titch, "Kentrox boosts coverage and capacity", Telephony, Jan. 25, 1993, pp. 1-2.
U.S. Patent and Trademark Office, "Advisory Action", U.S. Appl. No. 11/627,251, filed Oct. 30, 2013, pp. 1-5, Published: US.
U.S. Patent and Trademark Office, "Advisory Action", U.S. Appl. No. 13/335,128, filed Jun. 19, 2014, pp. 1-7, Published: US.
U.S. Patent and Trademark Office, "Decision on Appeal", U.S. Appl. No. 13/335,128, filed May 31, 2016, pp. 1-6, Published: US.
U.S. Patent and Trademark Office, "Examiners Answer", U.S. Appl. No. 13/335,128, filed Sep. 30, 2014, pp. 1-25, Published: US.
U.S. Patent and Trademark Office, "Final Office Action", U.S. Appl. No. 11/627,251, Sep. 12, 2013, pp. 1-8, Published: US.
U.S. Patent and Trademark Office, "Final Office Action", U.S. Appl. No. 11/627,251, Nov. 22, 2011, pp. 1-8, Published: US.
U.S. Patent and Trademark Office, "Final Office Action", U.S. Appl. No. 11/627,255, May 9, 2013, pp. 1-23, Published: US.
U.S. Patent and Trademark Office, "Final Office Action", U.S. Appl. No. 11/627,255, Sep. 8, 2010, pp. 1-14, Published: US.
U.S. Patent and Trademark Office, "Final Office Action", U.S. Appl. No. 13/335,128, Mar. 27, 2014, pp. 1-35, Published: US.
U.S. Patent and Trademark Office, "Interview Summary", U.S. Appl. No. 11/627,251, Jan. 16, 2013, pp. 1-5, Published: US.
U.S. Patent and Trademark Office, "Interview Summary", U.S. Appl. No. 11/627,251, Jan. 26, 2012, pp. 1-3, Published: US.
U.S. Patent and Trademark Office, "Interview Summary", U.S. Appl. No. 11/627,251, Jul. 12, 2013, pp. 1-5, Published: US.
U.S. Patent and Trademark Office, "Interview Summary", U.S. Appl. No. 13/335,128, Jun. 3, 2014, pp. 1-3, Published: US.
U.S. Patent and Trademark Office, "Notice of Allowance", U.S. Appl. No. 11/627,251, Jan. 9, 2014, pp. 1-18, Published: US.
U.S. Patent and Trademark Office, "Notice of Allowance", U.S. Appl. No. 11/627,255, Jul. 15, 2013, pp. 1-8, Published: US.
U.S. Patent and Trademark Office, "Notice of Allowance", U.S. Appl. No. 13/335,128, Oct. 12, 2016, pp. 1-31, Published: US.
U.S. Patent and Trademark Office, "Notice of Allowance", U.S. Appl. No. 15/444,134, Nov. 24, 2017, pp. 1-10, Published: US.
U.S. Patent and Trademark Office, "Notice of Allowance", U.S. Appl. No. 15/948,707, Sep. 12, 2019, pp. 1-8, Published: US.
U.S. Patent and Trademark Office, "Office Action" U.S. Appl. No. 11/627,251, Oct. 11, 2012, pp. 1-19, Published: US.
U.S. Patent and Trademark Office, "Office Action", U.S. Appl. No. 11/627,251, Mar. 8, 2010, pp. 1-43, Published: US.
U.S. Patent and Trademark Office, "Office Action", U.S. Appl. No. 11/627,251, Apr. 1, 2013, pp. 1-23, Published: US.
U.S. Patent and Trademark Office, "Office Action", U.S. Appl. No. 11/627,251, May 31, 2011, pp. 1-9, Published: US.
U.S. Patent and Trademark Office, "Office Action", U.S. Appl. No. 11/627,251, Nov. 15, 2010, pp. 1-12, Published: US.
U.S. Patent and Trademark Office, "Office Action", U.S. Appl. No. 11/627,255, Mar. 10, 2010, pp. 1-43, Published: US.
U.S. Patent and Trademark Office, "Office Action", U.S. Appl. No. 11/627,255, Nov. 6, 2012, pp. 1-28, Published: US.
U.S. Patent and Trademark Office, "Office Action", U.S. Appl. No. 13/335,128, Sep. 26, 2013, pp. 1-49, Published: US.
U.S. Patent and Trademark Office, "Office Action", U.S. Appl. No. 15/444,134, Jul. 14, 2017, pp. 1-72, Published: US.
U.S. Patent and Trademark Office, "Office Action", U.S. Appl. No. 15/948,707, Apr. 22, 2019, pp. 1-48, Published: US.
Wala, "A New Microcell Architecture Using Digital Optical Transport, Freedom Through Wireless Technology", May 18, 1993, pp. 585-588, Publisher: Proceedings of the Vehicular Technology Conference, New York IEEE.
European Patent Office, "Communication under rule 71(3) from EP Application No. 08728283.6 dated Jun. 1, 2018" from Foreign Counterpart to U.S. Appl. No. 11/627,251, filed Jun. 1, 2018, pp. 1-39, Published: EP.
U.S. Patent and Trademark Office, "Issue Notification", U.S. Appl. No. 11/627,251, May 27, 2014, p. 1, Published: US.
European Patent Office, "Extended European Search Report from EP Application No. 18204572.4 dated Jan. 16, 2019", from Foreign Counterpart to U.S. Appl. No. 11/627,251, filed Jan. 16, 2019, pp. 1-10, Published: EP.
"ADC Kentrox Wireless Systems Group CityCell 824—A Positioning White Paper", Mar. 1, 1993, pp. 1-6, Publisher: CITA Trade Show.
CityCell, Cellular Industry the Day Group, "ADC Kentrox CityCell Field Trial Yields Another First—Simultaneous Analog and Digital Calls", prior to Dec. 22, 2000, p. 1.
"ADC Kentrox Introduces CityCell 824, A Replacement for Conventional Cell Sites; Company's Original Goal was to Improve Fiber Optic T-1 Links Between Cells, MTSOs", Telocator Bulletin, Feb. 1993, p. 1 CityCell.
ADC Kentrox, "And now a few words from your Customers", Advertising Brochure, Aug. 1992, pp. 1-4, Published in: US.
Ameritech, "Broadband Optical Transport Digital Microcell Connection Service—Interface and Performance Specifications", Cellular Industry, Oct. 1993, pp. 1-3, Publisher: The Day Group.

(56) References Cited

OTHER PUBLICATIONS

"Digital transport for cellular", Microwaves and RF, Feb. 1993, p. 1 Published in: Portland, Oregon.
Foxcom Wireless Propriety Information, "Litenna In-Building RF Distribution System", White Paper Document No. 42-14-001-09C, 1998, pp. 1-8, Foxcom Wireless.
ZoneMaster, "Maximum Coverage for High-Capacity Locations", 1993, pp. 1-4, Publisher: Decibel Multi Media Microcell System.
Cellular Industry, The Day Group, "New Signal Transport Technology Digitizes the Cellular Band", Dec. 22, 2000, pp. 1-2.
Foxcom Wireless Proprietary Information, "Application Note RFiber—RF Fiberoptic Links for Wireless Applications", 1998, pp. 3-11, Published in: US.
"Tektronix Synchronous Optical Network (SONET)", "http://www.iec.org/online/tutorials/sonet/topic03.html", Aug. 28, 2002, pp. 1-5, Publisher: International Engineering Consortium.
GTE Laboratories, "Urban Microcell System Layout", Dec. 3, 2004, pp. 1-13.
State Intellectual Property Office, P.R. China, "Second Office Action from CN Application No. 201310074263.2 dated Nov. 2, 2015", from Foreign Counterpart to U.S. Appl. No. 11/627,251, filed Nov. 2, 2015, pp. 1-32, Published: CN.
Akos, et al., "Direct Bandpass Sampling of Multiple Distinct RF Signals", IEEE Transactions on Communications, Jul. 1999, pp. 983-988, vol. 47, No. 7, Publisher: IEEE.
Cox, et al., "A Radio System Proposal for Widespread Low-Power Tetherless Communications", IEEE Transactions on Communications, Feb. 1991, pp. 1-12, vol. 39, No. 2, IEEE.
ADC Kentrox, "ADC Kentrox Introduces Innovative Wireless Network Access Solution", Mar. 1, 1993, pp. 1-3, Published in: US.
ADC, "First Field Trial Results Exceed Expectations", Mar. 2, 1993, pp. 1-2, Published in: US.
European Patent Office, "Communication pursuant to Article 94(3) from EP Application No. 08728283.6 dated May 4, 2017", from Foreign Counterpart to U.S. Appl. No. 11/627,251, filed May 4, 2017, pp. 1-4, Published: EP.
European Patent Office, "Communication pursuant to Article 94(3) from EP Application No. 08728283.6 dated Aug. 25, 2014", from Foreign Counterpart to U.S. Appl. No. 11/627,251, filed Aug. 25, 2014, pp. 1-4, Published: EP.
European Patent Office, "Communication under rule 71(3) from EP Application No. 08728283.6 dated Jun. 2, 2018" from Foreign Counterpart to U.S. Appl. No. 11/627,251, filed Jun. 1, 2018, pp. 1-39, Published: EP.
Fogg and Powers, LLC, "312 Amendment", U.S. Appl. No. 11/627,251, dated Apr. 7, 2014, pp. 1-12, Published: US.
Grace, "Synchronous Quantized Subcarrier Multiplexing for Transport of Video, Voice, and Data", IEEE Journal on Selected Areas in Communications, Sep. 1990, pp. 1-8, IEEE.
Gupta et al., "Land Mobile Radio Systems—a Tutorial Exposition", IEEE, Jun. 1985, pp. 1-10, vol. 23, No. 6, IEEE.
Harvey, et al., "Cordless Communications Utilising Radio Over Fibre Techniques for the Local Loop", British Telecom Research Laboratories, 1991, pp. 1-5, IEEE.
State Intellectual Property Office, P.R. China, "Third Office Action from CN Application No. 201310074263.2 dated Feb. 25, 2016", from Foreign Counterpart U.S. Appl. No. 11/627,251, filed Feb. 25, 2016, pp. 1-12, Published: CN.
International Bureau, "Notification Concerning Transmittal of International Preliminary Report on Patentability from PCT Application No. PCT/US2008/052023 dated Aug. 6, 2009", from Foreign Counterpart to U.S. Appl. No. 11/627,251, filed Aug. 6, 2009, pp. 1-5, Published: Switzerland.
International Searching Authority, "Notification of Transmittal of the International Search Report and the Written Opinion from PCT Application No. PCT/US2008/052026 dated Jul. 24, 2008", from Foreign Counterpart to U.S. Appl. No. 11/627,251, filed Jul. 24, 2008, pp. 1-14, Published: EP.
International Searching Authority, "Notification of Transmittal of the International Search Report and Written Opinion from PCT Application No. PCT/US2008/052023 dated Nov. 10, 2008", from Foreign Counterpart to U.S. Appl. No. 11/627,251, filed Nov. 10, 2008, pp. 1-15, Published: EP.
Ishio et al., "A Two-Way Wavelength-Division-Multiplexing Transmission and its Application to a Switched TV-Distribution System", Electrical Communication Laboratories, pp. 1-10, Nippon Telegraph and Telephone Public Corporation, Japan.
Kobb, "Personal Wireless", Special Report/Communications, 1993, pp. 1-6, IEEE Spectrum.
Korean Patent Office, "Notice of Allowance from KR Application No. 10-2009-7017365 dated Nov. 20, 2014", from Foreign Counterpart to U.S. Appl. No. 11/627,251, filed Nov. 20, 2014, pp. 1-3, Published: KR.
Korean Patent Office, "Notice of Allowance from KR Application No. 10-2014-7017281 dated Mar. 6, 2015", from Foreign Counterpart to U.S. Appl. No. 11/627,251, filed Mar. 6, 2015, pp. 1-3, Published: US.
Korean Patent Office, "Office Action from KR Application No. 10-2009-7017365 dated Sep. 17, 2014", from Foreign Counterpart to U.S. Appl. No. 11/627,251, filed Sep. 17, 2014, pp. 1-6, Published: KR.
Lee et al., "Intelligent Microcell Applications in PCS", 43rd IEEE Vehicular Technology Conference, Dec. 1993, pp. 1-5, IEEE.
Merrett et al., "A Cordless Access System Using Radio-Over-Fibre Techniques", 41st IEEE Vehicular Technology Conference, May 1991, pp. 1-5, IEEE Vehicular Technology Society.
Nakatsugawa, et al., "Software Radio Base and Personal Stations for Cellular/PCS Systems", NTT Network Innovation Laboratories, 2000, pp. 1-5, IEEE.
O'Byrne, "TDMA and CDMA in a Fiber-Optic Environment", "Vehicular Technology Society 42nd VTS Conference Frontiers of Technology From Pioneers to the 21st Century", May 10-13, 1992, pp. 727-731, GTE Laboratories Incorporated, Published in: Denver, CO, IEEE.
Schneiderman, "Offshore Markets Gain in Size, Competitiveness", Microwaves and RF, Mar. 1993, pp. 1-8, vol. 32, No. 3, TriQuint Semiconductor.
State Intellectual Property Office P.R. China, "Notification to Grant Patent Right for Invention from CN Application No. 20088006156.3 dated Dec. 26, 2012", from Foreign Counterpart to U.S. Appl. No. 11/627,251, filed Dec. 26, 2012, pp. 1-4, Published: CN.
State Intellectual Property Office, P.R. China, "First Office Action from CN Application No. 200880006156.3 dated Jan. 18, 2012", from Foreign Counterpart to U.S. Appl. No. 11/627,251, pp. 1-13, Published: CN.
State Intellectual Property Office, P.R. China, "Notification to Grant Patent Right for Invention from CN Application No. 201310074263.2 dated May 31, 2016", from Foreign Counterpart to U.S. Appl. No. 11/627,251, filed May 31, 2016, pp. 1-5, Published: CN.
State Intellectual Property Office, P.R. China, "Second Office Action from CN Application No. 200880006156.3 dated Aug. 15, 2012", from Foreign Counterpart to U.S. Appl. No. 11/627,251, filed Aug. 15, 2012, pp. 1-14, Published: CN.
Steele, "Towards a high-capacity digital cellular mobile radio system", IEE Proceedings, Aug. 1985, pp. 1-12, IEE.
Tang, "Fiber Optic Antenna Remoting for Multi-Sector Cellular Cell Sites", GTE Laboratories, Jul. 9, 1993, pp. 1-22.
U.S. Patent and Trademark Office, "Issue Notification", U.S. Appl. No. 11/627,251, dated May 27, 2014, p. 1, Published in: US.
Wala, "A New Microcell Architecture Using Digital Optical Transport", 43rd IEEE Vehicular Technology Conference, Aug. 5, 1993, pp. 1-5.

* cited by examiner

DART MODULE FUNCTIONALITY

MODULAR WIRELESS COMMUNICATIONS PLATFORM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

*This Reissue Application is a reissue of application Ser. No. 15/948,707, filed Apr. 9, 2018, which issued as U.S. Pat. No. 10,554,424.*

The present application is *a reissue of application Ser. No. 15/848,707, filed Apr. 9, 2018, which issued as U.S. Pat. No. 10,554,424, and which is* a continuation of U.S. application Ser. No. 15/444,134 (hereafter the "'134 Application"), entitled "MODULAR WIRELESS COMMUNICATIONS PLATFORM," and filed on Feb. 27, 2017, which is a continuation of U.S. application Ser. No. 13/335,128 (hereafter the "'128 Application"), entitled "MODULAR WIRELESS COMMUNICATIONS PLATFORM," and filed on Dec. 22, 2011, which is a continuation of U.S. patent application Ser. No. 11/627,251 (hereafter the "'251 Application"), entitled "MODULAR WIRELESS COMMUNICATIONS PLATFORM," and filed on Jan. 25, 2007, wherein the contents of the foregoing applications are hereby incorporated herein by reference. The present application hereby claims the benefit of priority of the '134 Application, '251 Application, and the '128 Application.

BACKGROUND

Technology is continually evolving as consumer needs change and new ideas are developed. Nowhere is this more apparent than in the wireless communications industry. Wireless communication technologies have changed drastically over the recent past and have affected many aspects of our daily lives. As new wireless technologies are developed, companies must invest large amounts of time and resources to upgrade all their existing hardware so that it is compatible with the new technology. Often a change in one component of a system requires an update of the entire system.

The infrastructure of a wireless communication system is commonly designed for a specific technology and a specific frequency band. Thus, once a service provider installs a particular infrastructure, a complete overhaul of a system is required to upgrade to a new technology or change to another frequency band. In addition, if a service provider would like to carry multiple frequency bands, the provider generally has to install a different set of hardware for each technology and frequency band carried. Thus, if the service provider carries four frequency bands of service for mobile customers; four different sets of hardware must be installed in each transmission and reception location.

In addition to changes in technology, consumer demand for a particular service may change after a service is installed. For example, access points initially deployed using over-the-air repeaters or simulcast distributed antenna systems, may need to be replaced with full base stations to support the increased consumer demand. This again, will require major overhauls of existing infrastructure. Moreover, these changes occur not infrequently, are costly and are often necessary to keep pace with competitors within the industry.

For the reasons stated above, and for other reasons stated below which will become apparent to those skilled in the art upon reading and understanding the present specification, there is a need in the art for a wireless communications platform that keeps pace with the rapid changes in wireless communications protocols.

SUMMARY

The following summary is made by way of example and not by way of limitation. It is merely provided to aid the reader in understanding some of the aspects of the invention.

In one embodiment, a distributed antenna system is provided. The distributed antenna system includes a host unit and a remote unit coupled to the host unit over a communication medium. The host unit includes an interface adapted to communicate RF signals with an Internet Protocol (IP) gateway as IP data; a baseband processor, coupled to the IP gateway, the baseband processor configured to convert between IP data and baseband, digital signals; and a serializer/deserializer, coupled to the baseband processor, the serializer/deserializer configured to convert between baseband, digital data and a serial data stream. The remote unit includes a serializer/deserializer, coupled to the communication medium, the serializer/deserializer configured to convert between the serial data stream and RF sampled data; an RF module, coupled to the serializer/deserializer, the RF module configured to convert between RF sampled data and an RF signal; and an antenna coupled to the RF module.

In another embodiment, another distributed antenna system is provided. This distributed antenna system includes a host unit and a remote unit coupled to the host unit over the communication medium. The host unit includes an RF module configured to communicate with a base station using RF signals configured for communication over an antenna, the RF module configured to convert between the RF signals configured for communication over an antenna and RF sampled data; a serializer/deserializer coupled to the RF module and configured to communicate with a base station using signals corresponding to baseband, digital data, the serializer/deserializer configured to convert between RF sampled data and first serial data and configured to convert between baseband, digital data and second serial data; and a multiplex module coupled to the serializer/deserializer, the multiplex module configured to multiplex the first serial data and the second serial data into a high speed serial data stream and to demultiplex a high speed serial data stream into the first serial data and the second serial data. The remote unit is configured to convert the high speed serial data stream into one or more RF signals.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the device may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

The present apparatus is a modular wireless platform that enables a system facilitator to easily and inexpensively adapt their wireless system for use with different data transport mechanisms, frequency bands, communication technologies, and intelligence distribution. This modular platform is made up of a reconfigurable host unit and a reconfigurable remote unit designed for use in a system with a central node and a plurality of distributed antennas. The host unit is located near the central node and facilitates transmission/reception of information to/from the remote units which are located remotely with an accompanying antenna. The remote units function to transmit/receive transmissions from the host unit and transmit/receive wireless signals over accompanying antenna to mobile costumers.

Host unit and remote unit have a modular design and defined interfaces that allow components to be removed and installed to adapt to the needs of the service providers. Both host and remote unit are designed around a serial radio frequency (SeRF) communicator and have a defined interface where different varieties of digital to analog radio frequency transceiver (DART) modules can be connected and disconnected. There are many different DART modules, and each DART module is designed for a particular technology and frequency band. Thus, technology and frequency band adjustments can be made by simply replacing the DART module in the host unit or remote unit. Additionally, host unit and remote unit are designed to allow different transport mechanisms between the host unit and remote unit. For example, the same host unit and remote unit that use fiber optic for inter-unit transmission can be adapted to use E Band wireless transmission instead of or concurrently with the fiber optic. Finally, wireless processing functionality can be placed all on a base station near the central node, or the functionality can be distributed throughout each of the remote units. The flexibility to modify the functionality of each remote unit allows the wireless platform to support centralized base stations and distributed base stations, either separately or concurrently.

Figure 1:
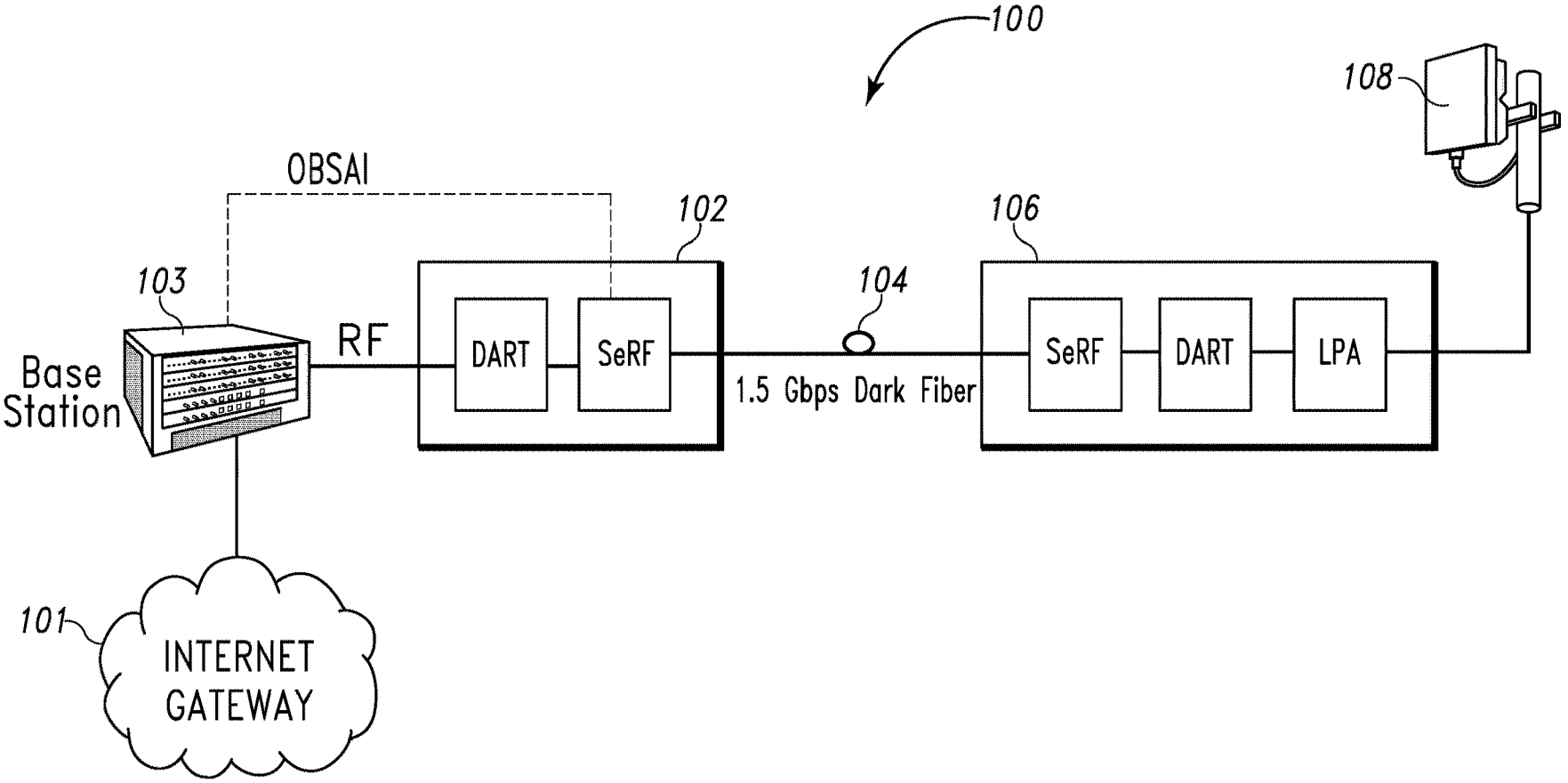
FIG. 1 is an illustration of one embodiment of a system using a modular wireless communications platform.

FIG. 1 is a block diagram of one embodiment of a system 100 using a modular wireless communications platform. System 100 is a field configurable distributed antenna system (DAS) that provides bidirectional transport of a fixed portion of RF spectrum from an Internet Protocol (IP) gateway 101 to a remote antenna 108. Along with IP gateway 101 and remote antenna 108, system 100 includes a base station 103, a host unit 102, a transport mechanism 104, and a remote unit 106. Host unit 102, a modular host transceiver and remote unit 106, a modular remote radio head, work together to transmit and receive data to/from remote antennas. In this embodiment, host unit 102 provides the interface between a base station 101 a signal transport mechanism 104. Remote unit 106 provides the interface between transport mechanism 104 and a remote antenna 108. In this embodiment, signal transport mechanism 104 is an optical fiber, and host unit 102 sends optical signals through the optical fiber to remote unit 106.

In the transmission direction of transport, base station 103 performs baseband processing on IP data from IP gateway and places the IP data onto a channel. In one embodiment base station 103 is an IEEE 802.16 compliant base station. Optionally, base station 103 may also meet the requirements of WiMax, WiBro, or a similar consortium. In another embodiment, base station 103 is an 800 MHz or 1900 MHz base station. In yet another embodiment, the system is a cellular/PCS system and base station 103 communicates with a base station controller. In still another embodiment, base station 103 communicates with a voice/PSTN gateway. Base station 103 also creates the protocol and modulation type for the channel. Base station 103 then converts the IP packetized data into an analog RF signal for transmission over antenna 108. Base station 103 sends the RF signal to host unit 102. Host unit 102 converts the RF signal for long distance high speed transmission over transport mechanism 104. Host unit 102 sends the signal over transport mechanism 104, and the signal is received by remote unit 106. Remote unit 106 converts the received signal back into an RF signal and transmits the signal over antenna 108 to consumer mobile devices.

Figure 2:
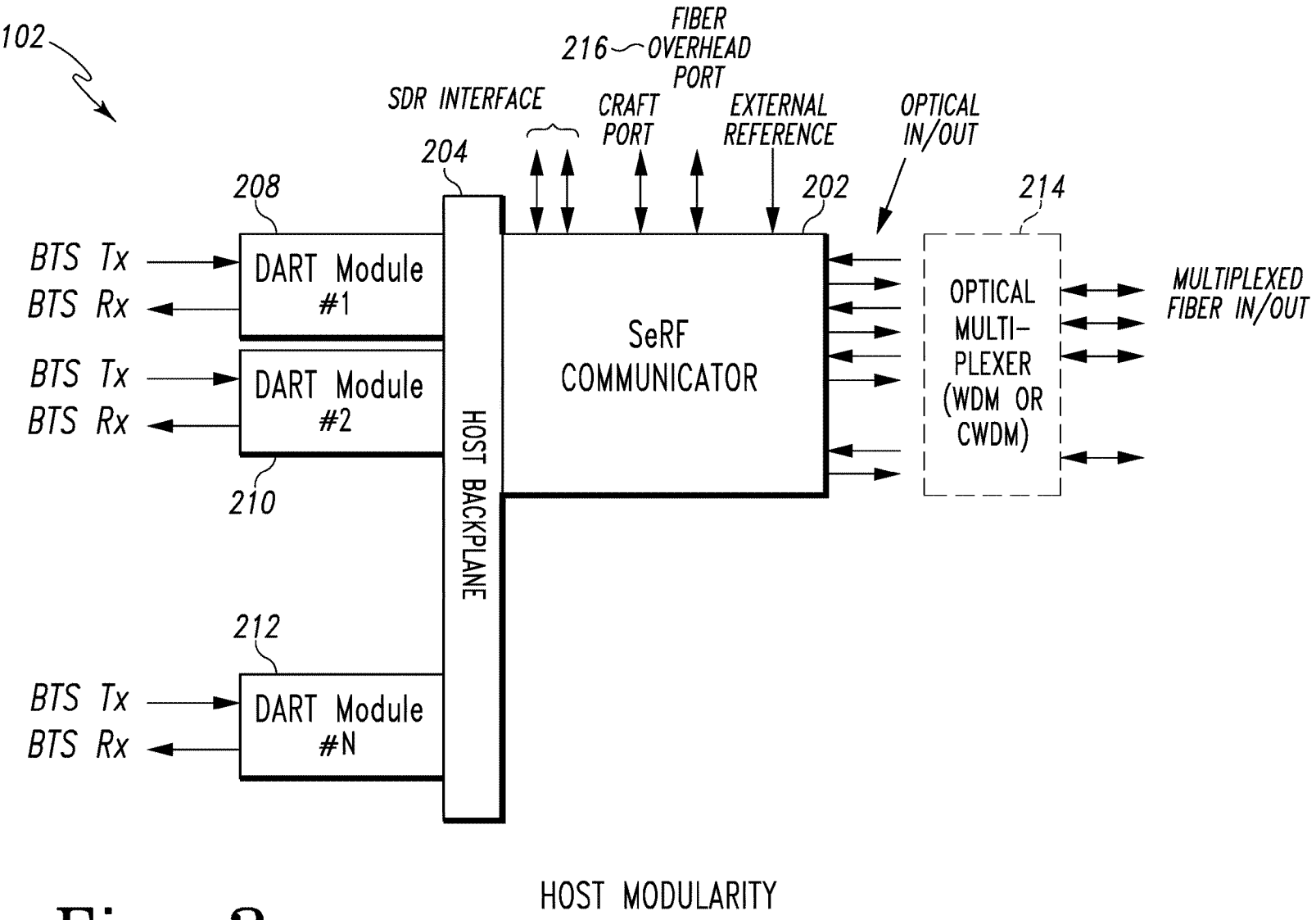
FIG. 2 illustrates a schematic view of one embodiment of a host unit for use in the system of FIG. 1.

FIG. 2 illustrates a schematic diagram of one embodiment of a host unit 102 for use in a modular wireless communications platform. Host unit 102 has a serial radio frequency (SeRF) communicator 202 that is coupled to a digital to analog radio frequency transceiver (DART) interface 204. DART interface 204 has a plurality of DART connectors each of which is configured to receive a pluggable DART module 208. Further, DART connectors are configured to connect DART module 208 to SeRF communicator 202. DART interface 204 is a common interface that is configured to allow communication between SeRF communicator 202 and different varieties of DART modules 208. Additionally, DART interface 204 allows multiple DART modules 208, 210, 212 to connect to a single SeRF communicator 202. In this embodiment, DART interface 204 is a passive host backplane to which SeRF communicator 202 also connects. In this embodiment, DART interface 204 has eight DART connectors for a DART module 208. In another embodiment, instead of being a host backplane, DART interface 204 is integrated with SeRF communicator 202.

DART modules 208, 210, 212 provide bi-directional conversion to/from analog RF signals from/to digital sampled RF. In one direction of communication, DART module 208 receives an incoming analog RF signal from base station 103 and converts the analog signal to a digital signal for use by SeRF communicator 202. In the other direction DART modules 208, 210, 212 receive digital sampled RF data from SeRF communicator 202 and convert the data to analog RF for use by base station 103.

Each DART module 208, 210, 212 has a common communication interface for communication with SeRF communicator 202, and a RF processing portion that is exclusive to one frequency band and communication technology. Each DART module 208, 210, 212, therefore, converts to/from one analog RF to the digital signal used by SeRF communicator. For example, DART module 208 is designed to transmit 850 MHz cellular transmissions. As another example, DART module 210 transmits 1900 MHz PCS signals. Some of the other options for DART modules 208, 210, 212 include Nextel 800 band, Nextel 900 band, PCS full band, PCS half band, BRS, WiMax, and the European GSM 900, DCS 1800, and UMTS 2100. By allowing different varieties of DART modules 208, 210, 212 to be plugged into DART interface 206, host unit 102 is configurable to any of the above frequency bands and technologies as well as any new technologies or frequency bands that are developed. Host unit 102, once installed, is field configurable to transmit a variety desired by insertion of a different DART module. Additionally, since SeRF communicator 202 is configured to communicate with multiple different DART modules 208, 210, 212, a single host unit 102 can transmit/receive multiple frequency bands or technologies.

SeRF communicator 202 provides bi-directional conversion to/from a SeRF stream from/to a high speed optical serial data stream. In one direction, SeRF communicator 202 receives incoming SeRF streams from DART modules 208, 210, 212 and sends a serial optical data stream over transport mechanism 104 to remote unit 106. In the other direction, SeRF communicator 202 receives an optical serial data stream from a remote unit 106 and provides SeRF streams to DART modules 208, 210, 212. In one embodiment, the SeRF stream between DART module 208 and SeRF communicator is a parallel stream. In another embodiment, SeRF stream is a serial data stream.

SeRF communicator 202 also allows multiple DART modules 208, 210, 212 to operate in parallel. SeRF communicator 202 actively multiplexes the signals from each DART module 208, 210, 212 such that they are sent simultaneously over a single transport mechanism 104. To accomplish this, SeRF communicator 202 presents a clock signal to each DART module 208, 210, 212 to ensure synchronization.

In one embodiment, an optical multiplex module 214 is optically coupled to SeRF communicator 202. Optical multiplex module 214 performs multiplexing/de-multiplexing of an optical serial data stream to/from SeRF communicator 202 over transport mechanism 104. In this embodiment, optical multiplex module 214 performs wavelength division multiplexing.

In another embodiment, transport mechanism 104 is a wireless millimeter wave signal transceiver (e.g. E Band/70 GHz radio). In this embodiment, host unit 102 sends optical signals to the millimeter wave transceiver which converts the optical signals into millimeter waves and transmits the millimeter waves to a similar millimeter wave transceiver connected to remote unit 106. In yet another embodiment, transport mechanism 104 is a microwave radio transceiver. In still another embodiment, transport mechanism 104 is a T1 connection for transmission of IP data.

Figure 3:
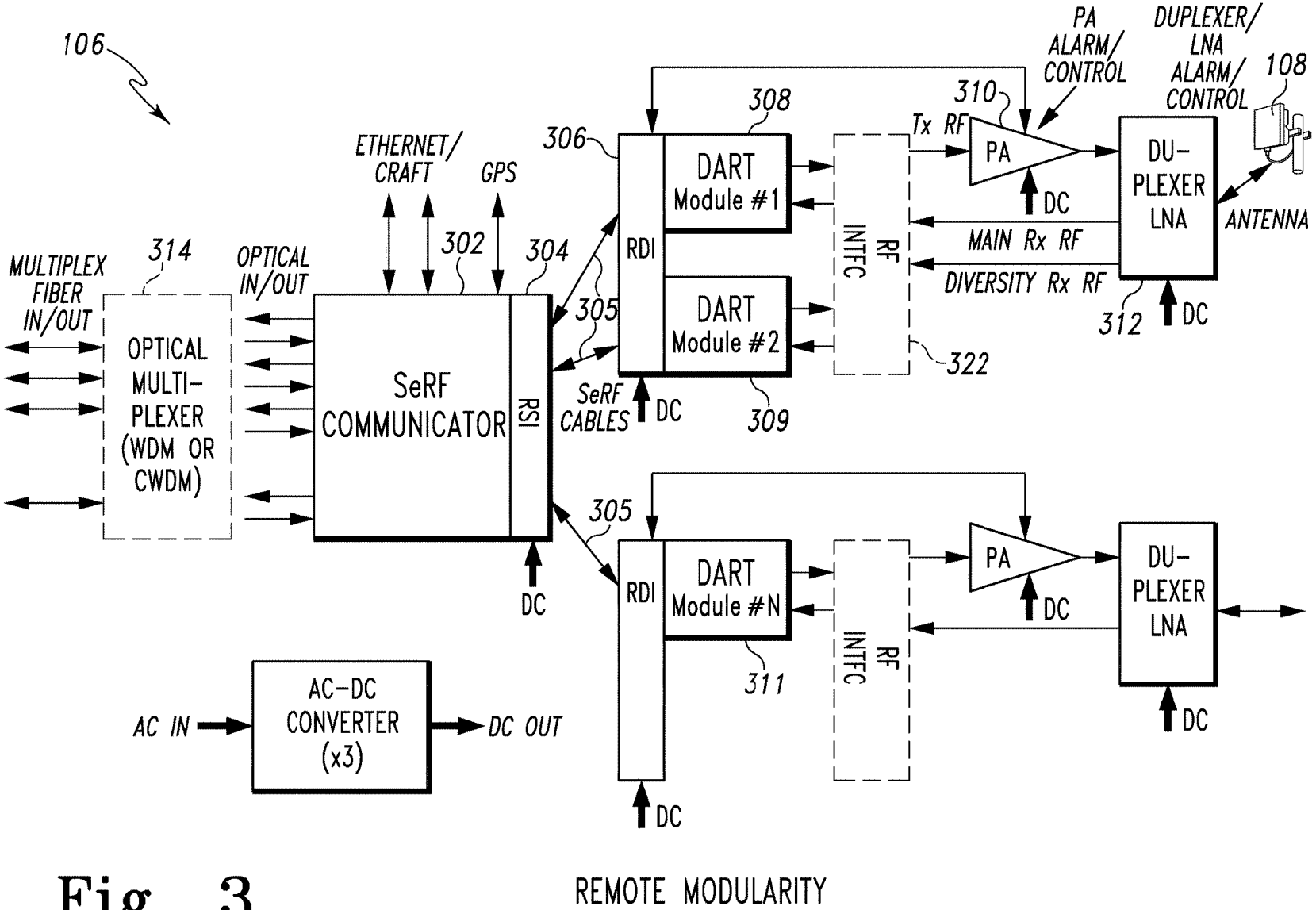
FIG. 3 illustrates a schematic view of one embodiment of a remote unit for use in the system of FIG. 1.

FIG. 3 is a schematic diagram of one embodiment of a remote unit 106 for use in a modular wireless communications platform. Remote unit 106 has a SeRF communicator 302, a SeRF interface 304, at least one DART interface 306. In this embodiment, DART modules 308, 309, 311, power amplified 310, duplexer/linear amplifier 312, and optical multiplex module 314 are all installed in remote unit 106 which is connected to antenna 108.

SeRF communicator 302 is designed and performs similar to SeRF communicator 202 of host unit 102. Likewise, DART modules 308, 309, 311 have the same features and design options as DART modules 208, 210, 212 of host unit 102. There is a slight difference from host unit 102, however, in the manner in which SeRF communicator 302 and DART modules 308, 309, 311 are connected. In this embodiment of remote unit 106, SeRF communicator 302 has a SeRF interface 304 which is used to link SeRF communicator to SeRF cables 305. SeRF cables 305 are used to allow DART modules 308, 309, 311 to be physically spaced from SeRF communicator 302 and from other DART modules. SeRF cables 305 connect to DART interface 306. DART modules 308 connected to DART interface 306 and communicate with SeRF communicator 302 through DART interface 306 over SeRF cables 305 and through SeRF interface 304. In another embodiment, SeRF interface 304, and SeRF cables 305 are eliminated and DART interface 306 is integrated into SeRF communicator 302.

DART modules 308 perform similar to DART module 208, except the ultimate destination/origination of the signals to/from DART modules 308 is antenna 108 and not base station 101 as in host unit 102. Optical multiplex module 314 also performs similarly to optical multiplex module 214 of host unit 102.

In the transmission direction, once a signal is converted to analog RF by DART module 308, the signal is sent through RF interface 322 (explained below) to power amplifier 310. Power amplifier 310 amplifies the RF signal received from DART module 308 for output through duplexer/linear amplifier 312 to antenna 108. Similar to DART modules 308, 309, 311, power amplifier 310 is designed for a certain frequency band and technology. Power amplifier 310 is, therefore, removable and is plugged into a power amplifier connector on remote unit 106 which is configured to receive power amplifier 310. Power amplifier connector is configured to couple power amplifier to duplexer/linear amplifier 312 and to DART module 308. Power amplifier 310 also has an alarm and control line that is connected to DART interface 306 for communication to SeRF communicator 302.

Once the signal is amplified by power amplifier 310, duplexer/linear amplifier 312 provides duplexing of the signal which is necessary to connect transmit and receive signals to a common antenna. Duplexer/linear amplifier 312 also provides low noise amplification of received signals and rms power detection of incident and reflected RF power in transmission signal. Similar to DART modules 308, 309, 311 and power amplifier 310, duplexer/linear amplifier 312 is frequency band and technology specific, and is removable. Duplexer/linear amplifier 312 plugs into a connector in remote unit 106 configured to receive duplexer/linear amplifier 312. Furthermore, the connector is configured to couple duplexer/linear amplifier 312 to power amplifier 310 and to antenna 108. Duplexer/linear amplifier 312 also has a control and alarm line that is connected to DART interface 320 for communication to SeRF communicator 302. In this embodiment, the frequency band and technology allow use of a single power amplifier 310 and duplexer/linear amplifier 318 by both DART module 308 and DART module 309. In this embodiment, a RF interface 322 is placed between power amplifier 310, duplexer/linear amplifier 312 and DART modules 308, 309. RF interface 322 provides RF splitting/combining of the RF transmit and receive signals necessary to allow connection of two DART modules 308, 309 to a single power amplifier 310 and duplexer/linear amplifier 312.

Figure 4:
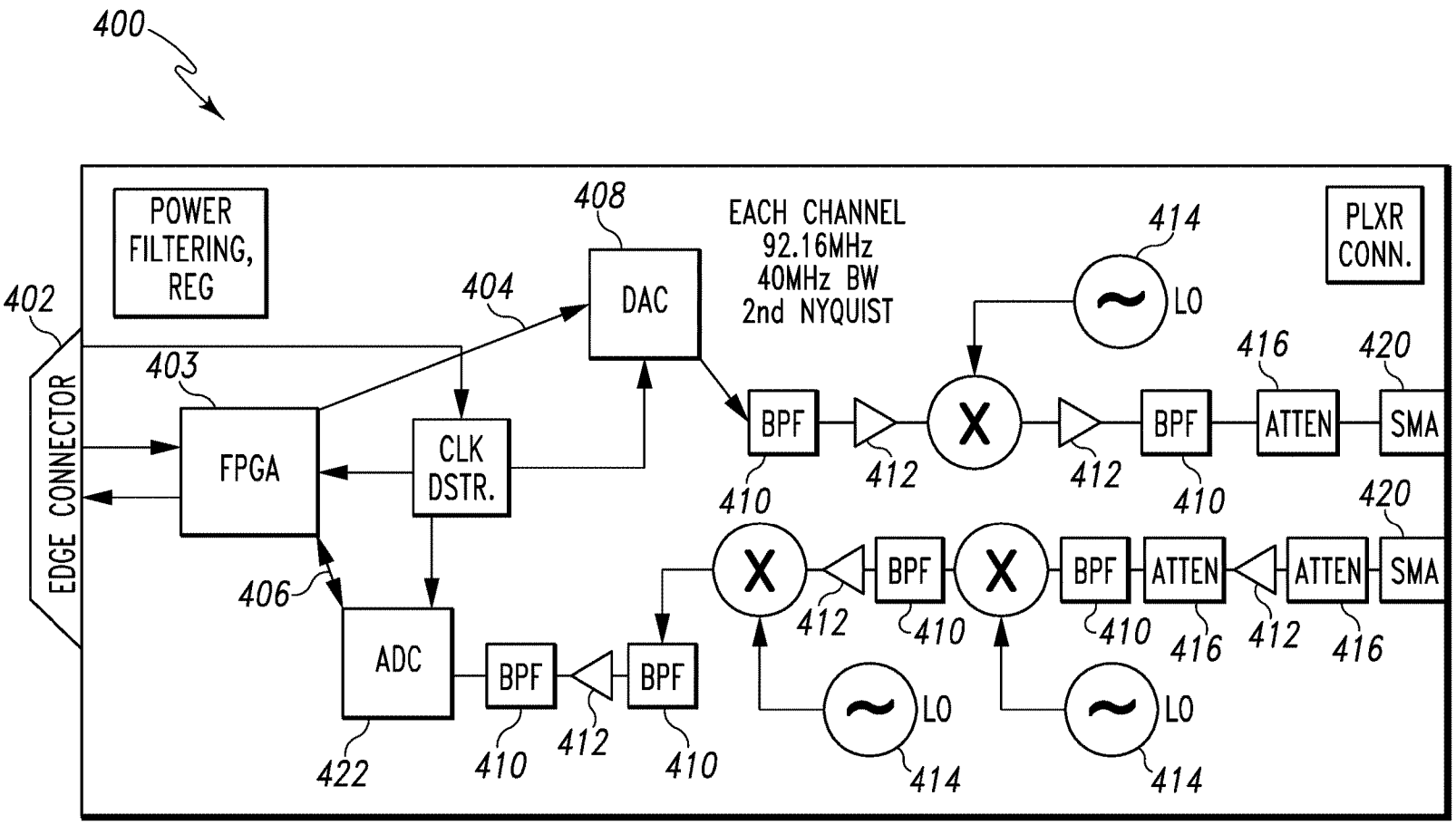
FIG. 4 illustrates a schematic view of one embodiment of a digital to analog radio frequency transceiver module for use in either the host unit of FIG. 2 or the remote unit of FIG. 3.

FIG. 4 shows a schematic view of one embodiment of a DART module 400 for use in either host unit 102 or remote unit 106. There are multiple embodiments of DART module 400 as described above, however, the common elements are described hereafter. DART module 400 has an edge connector 402 for connection to a DART interface. DART module 400 has two main signal paths; a transmission path 404 and a reception path 406. For signals received from a SeRF communicator, DART module 400 forms parallel digital RF data from the incoming SeRF stream, if needed, at FPGA 403. In this embodiment, FPGA 403 is a logic device that is programmed to convert serial digital data into RF sampled data and programmed to convert RF sampled data into serial digital data. DART module 400 then converts the digital signal to analog with digital to analog converter (DAC) 408. Transmission path 404 continues as DART module 400 filters, amplifies and up-converts the analog signal for RF transmission with an assortment of filters 410, amplifiers 412, an oscillator 414, and an attenuator 416. The transmission path exits DART module 400 at an SMA connector 420. The signals travel in the opposite direction down reception path 406, where they are converted from analog to digital and sent to a SeRF communicator. First signals are received at SMA connector 420. DART module 400 then amplifies, down-converts, filters the incoming RF signal with a plurality of filters 410, amplifiers 412, oscillators 414, and attenuators 416. DART module 400 then digitizes the signal with analog to digital converter 422. FPGA 403 then forms a SeRF stream and provides the SeRF stream as parallel digital RF sampled data to a SeRF communicator.

Figure 5:
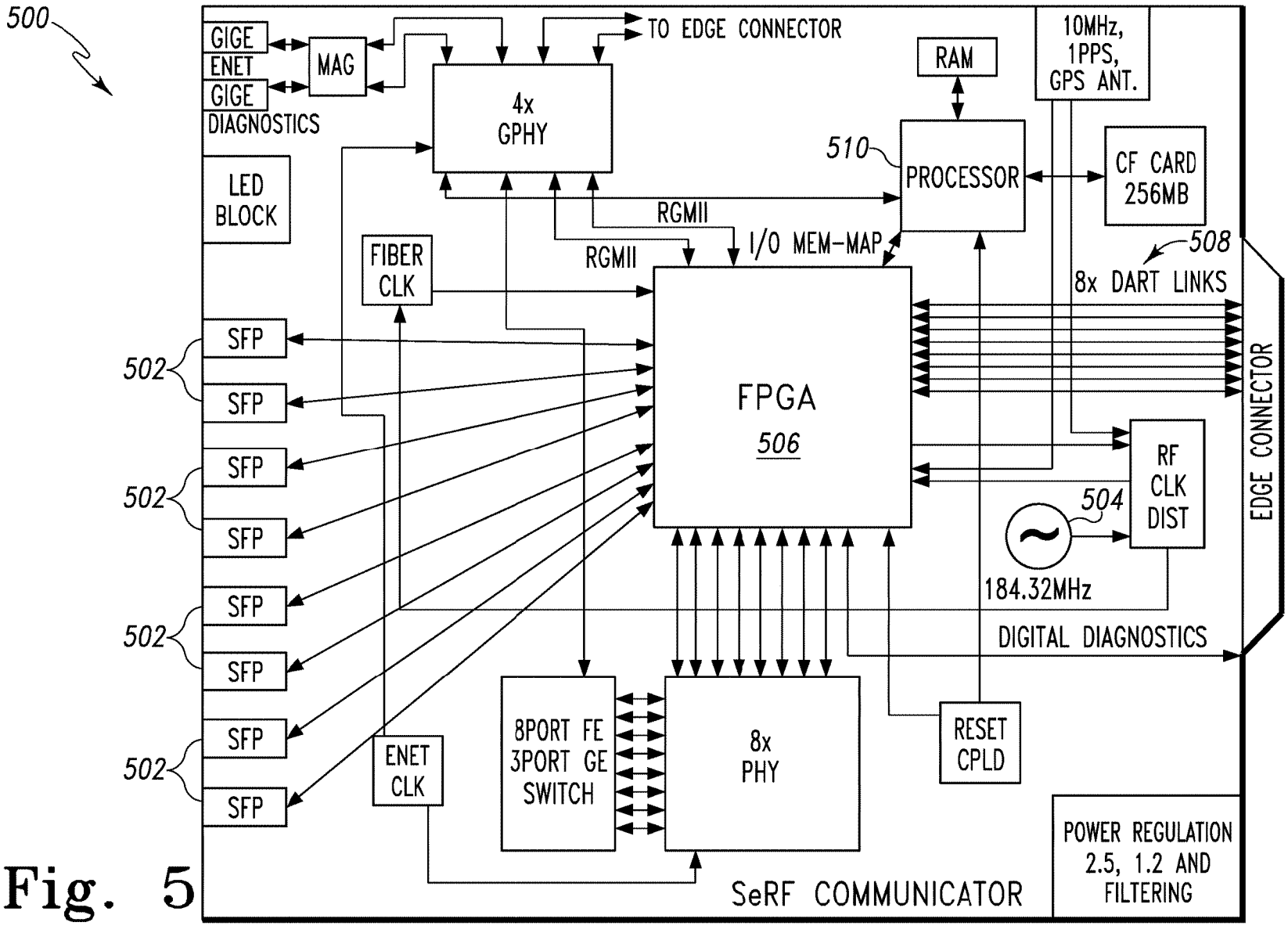
FIG. 5 illustrates a schematic view of one embodiment of a serial radio frequency communicator for use in either the host unit of FIG. 2 or the remote unit of FIG. 3.

FIG. 5 illustrates a schematic view of one embodiment of a SeRF communicator 500 for use in either host unit 102 or remote unit 106. Serial radio frequency communicator 500 has a plurality of optical input/outputs 502, a clock 504, a field programmable gate array (FPGA) 506, a plurality of DART links 508, and a processor 510. In this embodiment, SeRF communicator 500 has eight (8) optical input/outputs 502. Optical input/outputs 502 connect to optical fiber which is used as a transport mechanism, or optical fiber that links SeRF communicator 500 to an optical multiplexer or a millimeter waver or microwave transceiver. Optical input/outputs 502 receiver high speed serial data transmission from another SeRF communicator. In addition, optical input/outputs 502 receive Open Base Station Architecture (OBSAI) protocol data from a baseband unit and/or a base station. In one embodiment, to aid in the ability of optical input/outputs 502 to receive multiple data formats, the signals received from optical input/outputs 502 are transmitted at the same frequency which is set to match the OBSAI protocol. Also, OBSAI data is stripped at the data link layer with a 8B/10B encoder to provide a good ones and zeros balance and remove approximately 20 percent of the OBSAID overhead. Finally, 16-bit filler words are used to provide a $24/25^{ths}$ transport ratio and match a 2.94 GBps transport speed to enable transport of OBSAI or SeRF data. The OBSAI protocol data is explained in more detail below with reference to FIG. 6. Optical input/outputs 206, also conform to the optical small form-factor pluggable multi-source agreement. Alternatively, any frequency of signal or shape of connector could be used as is known in the art. SeRF communicator 500 has eight (8) optical input/outputs and DART links 508 for 8 separate DART modules which transmit RF sampled data to/from DART modules.

In one embodiment, DART links 508 and corresponding connectors on a DART interface carry 6 slots of digitized RF payload for reading and writing DART FPGA registers from SeRF FGPA 506. Each slot consists of 16 bits: 15 bits of digitized RF and 1 overhead bit used to transfer FPGA register data. The slots are framed in groups of 6 16-bit words, with each slot repeating at the sampling rate of 15.36 M samples per second. A "superframe" of 32 frames encapsulates the data payload and provides synchronization. Thus, in this embodiment DART links 508 are 16-bit parallel data streams. In another embodiment, DART links 508 are serial. FPGA 506 has eight SERDES to serialize and de-serialize each data stream. Thus, there is one SERDES running for each DART link 508 and optical input/output 502. In this embodiment, each SERDES runs at either half rate or full rate and 50% efficiency such that the SERDES offers 6 RF slots of data. In another embodiment, there are half as many SERDES as DART modules. Thus, the SERDES run at full rate, 100% efficiency and offer 12 RF slots of data.

In one direction, SeRF communicator 500 receives incoming SeRF streams over DART links 508 from DART modules, assembles data frames, and sends an outgoing optical serial data stream through optical input/outputs 502. In the other direction, SeRF communicator 500 receives an optical serial data stream from another SeRF communicator at optical input/outputs 502. SeRF communicator 500 then disassembles the frames of the serial data stream, and provides SeRF streams over DART links 508 to DART modules. SeRF communicator 500 also performs splitting and summing for digital simulcast, and provides a user interface for alarm, status, or configuration management. SeRF communicator 500 also provides bi-directional conversion to/from OBSAI protocol data received at optical input/outputs 502 from/to RF sampled data for DART modules. Additionally, SeRF communicator 500 has at least one RJ-45 connector 216 for receiving IP packets. In one embodiment, RJ-45 connector 216 supports Gigabit Ethernet.

Figure 6:
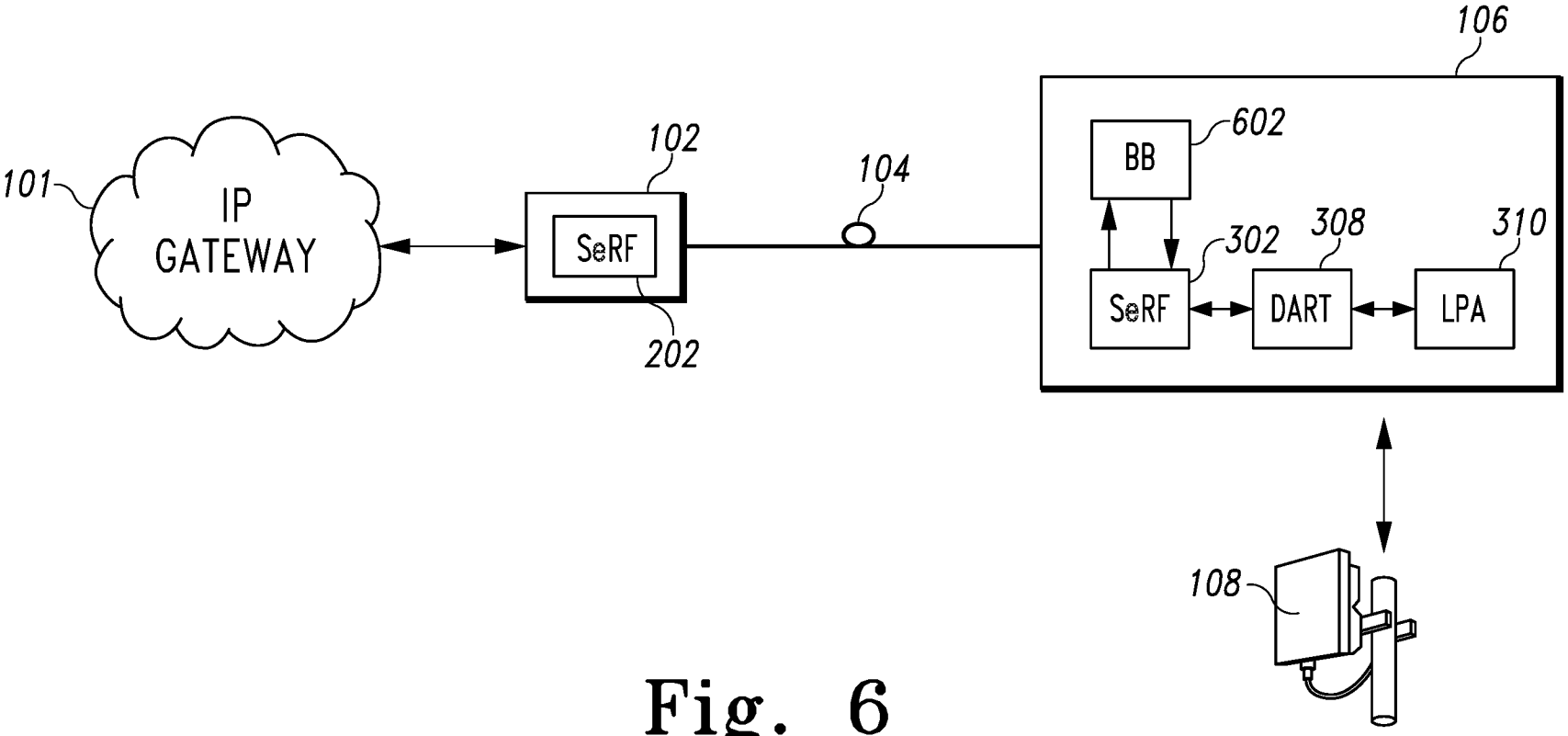
FIG. 6 illustrates another configuration of the system of FIG. 1.
Figure 7:
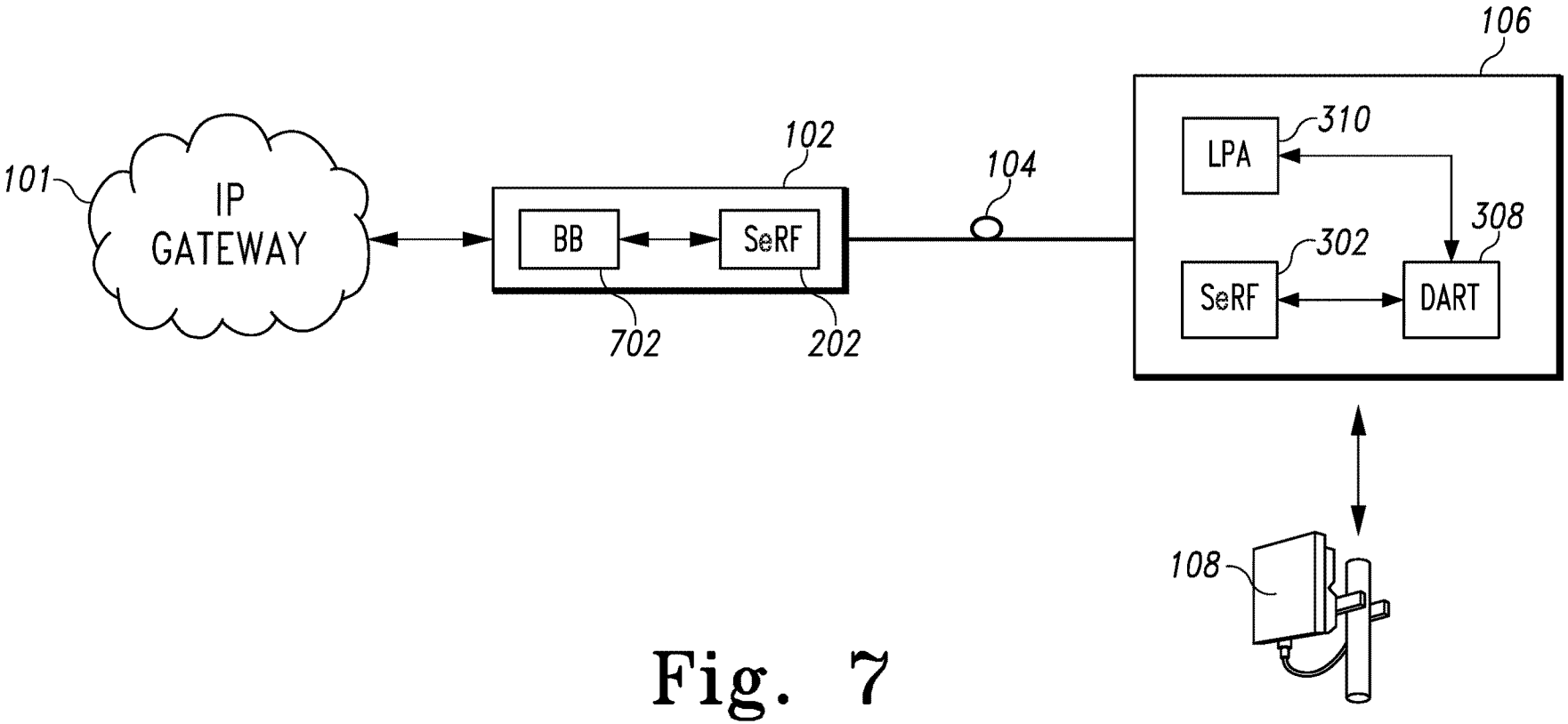
FIG. 7 illustrates yet another configuration of the system of FIG. 1.

Along with being configurable to communicate on different frequency band/sub-bands and with different technologies, host unit 102 and remote unit 106 are configurable to perform more or less of the wireless processing of the RF signal. Host unit 102 and remote unit 106 are configurable into three different functional configurations. The first configuration is illustrated in FIG. 1 and has host unit 101 and remote unit 106 functioning as a range extender for base station 101. In this configuration, backhaul data is transmitted between host unit 102 and remote unit 106. The second configuration is illustrated in FIG. 6, and has fronthaul data transmitted between host unit 102 and remote unit 106. In this configuration remote unit 106 performs the functionality of a base station. The third configuration is illustrated in FIG. 7 and has 'midhaul' data transmission between host unit 102 and remote unit 106. In this embodiment, 'midhaul' data refers to OBSAI protocol data or similar partially processed wireless signals. Each of the three configurations will now be explained in further detail.

Referring back to FIG. 1, system 100 shows one configuration for connection of host unit 102 and remote unit 106 in which remote unit 106 functions as a range extender. In this option, base station 103 contains all necessary components to convert IP packets received from an Internet gateway into an analog bit stream for transmission over antenna 108. Except for needed amplification, the signal is ready for transmission over antenna 108 once sent by base station 103. Host device 102 and remote device 106 do not perform any further processing on the data except what is required to send and receive the data over long range transmission. Host unit 102 contains the components as illustrated in FIG. 2 and receives the analog signal from base station 103 at the DART module matching the analog signal frequency band and technology. Host unit 102 converts the signal and transmits the data over transport mechanism 104. Remote unit 106 contains the components as shown in FIG. 3. Remote unit 106 receives the signal from transport mechanism 104 and sends the data to the DART module matching the frequency band and technology. The signal is then converted and transmitted over antenna 108 to mobile users.

FIG. 6 shows another configuration of a system 100 where base station functionality is performed at remote unit 106. This configuration provides increased capacity to a network of antennas by allowing each remote unit 106 to function as a base station. In this embodiment of system 100, IP data is not processed by a base station before sending to remote unit 106. Instead IP data is received at host unit 102 directly from IP gateway 101. IP data is received at an RJ-45 connector on SeRF communicator 202 of host unit 102. In this configuration, therefore, the signal does not travel through DART module 208, 210, 212 of host unit 102. The IP data is converted to a serial optical stream and transmitted over transport mechanism 104 to remote unit 106. Remote unit 106 receives the IP data at SeRF communicator 302.

Remote Unit 106, in this embodiment, has a baseband unit 602 which is connected to a slot of DART interface 306. In this configuration, baseband unit 602 is in fact a remote WiMax base station which replaces the functionality of base station 103 in the first configuration. SeRF communicator 302 converts the packetized optical data received into 25-75 Mbps data and sends the data over to baseband unit 602. Baseband unit 602 performs baseband processing to put the IP data onto a channel. Baseband unit 602 also creates the protocol and modulation type for the channel. Baseband unit 602 then converts the data to match the OBSAI protocol. This OBSAI data is sent back into an optical input/output 502 of SeRF communicator 302. SeRF communicator 302 uses software to convert the OBSAI protocol data into digital RF sampled data and sends the digital RF data to DART module 308 for transmission over antenna 108. In another embodiment, baseband unit 602 converts IP data to/from common public radio interface (CPRI). Alternatively, any digital baseband protocol, including standard and proprietary protocols, or any software defined radio interface could be used by baseband unit 602 and SeRF communicator 302.

FIG. 7 illustrates yet another configuration of a system 100 in which remote unit 106 performs the functionality of a base station, and the baseband processing is performed prior to transmission by host unit 102. In this embodiment, IP data is received at a baseband unit 702 which converts the IP data into data conforming to the OBSAI protocol. In another embodiment, OBSAI protocol data is communicated between SeRF communicator 202 and a base station 103 as shown in FIG. 1. Alternatively, any of the protocols listed with respect to FIG. 6 could be used. The OBSAI protocol data is converted to serial data in SeRF 202 of host unit 102 before the serial data is transmitted to remote unit 106. Here again, DART module 208 is not used at host unit 102, since the data has not been converted to RF yet. The OBSAI protocol data is received by remote device 106 at SeRF communicator 302. SeRF communicator 302 converts the OBSAI protocol data into digital RF sampled data and interfaces with DART 308. DART 308 converts the data to analog RF and the signal is sent over antenna 108.

Since host unit 102 and remote unit 106 have multiple input/outputs and can have multiple types of DART modules connected to each, host unit 102 and remote unit 106 are configured to multiplex different functional configurations through different input/outputs simultaneously. Thus, in one embodiment, a first input/output of host unit 102 and remote unit 106 function as a range extender for a base station. A second input/output of host unit 102 and remote unit 106 function to transmit 'midhaul' data. At the same time a third input/output of host unit 102 and remote unit 106 functions to transmit fronthaul data and remote unit 106 performs baseband processing upon the data.

The modular design of modular wireless communications protocol allows many different combinations of transport mechanisms, frequency bands, communication technologies, and processing functionality to operate simultaneously on the same host unit and remote unit.

Figure 8:
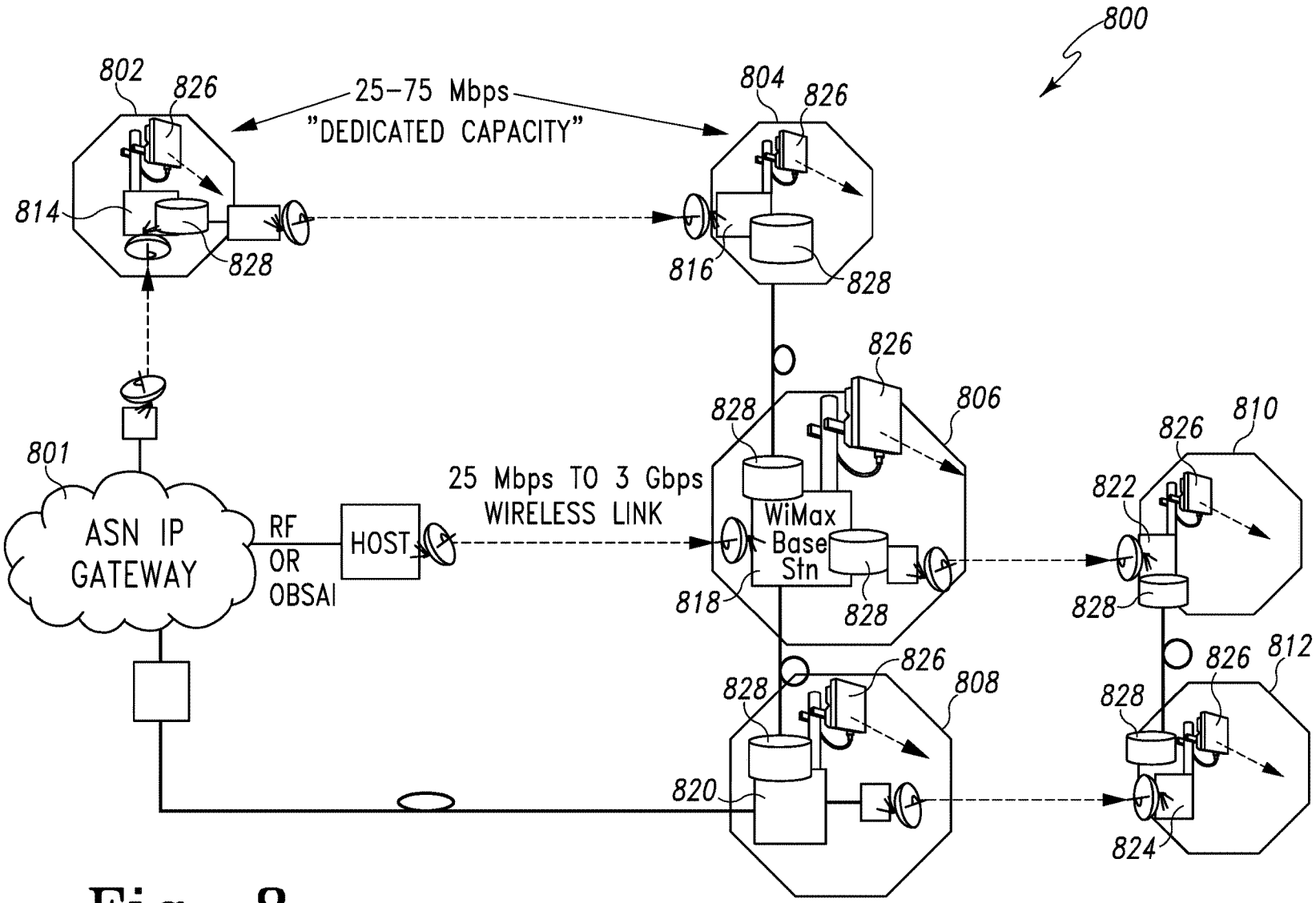
FIG. 8 illustrates one embodiment of a distributed base station system.

Placing a base station at a remote wireless communication stations such as described with the configuration of FIG. 6 allows service providers to set up a distributed base station system. FIG. 8 illustrates one embodiment of a distributed base station system 800. System 800 has a central node 801 having an IP gateway and a plurality of remote wireless communication stations 802, 804, 806, 808, 810, 812. Each remote station 802, 804, 806, 808, 810, 812 includes a remote unit 814, 816, 818, 820, 822, 824, an antenna 826, and a router 828. In this embodiment, remote unit 818 and remote unit 820 are configured into a WiMax compatible base station. In another embodiment, all remote units 814, 816, 818, 820, 822, 824 are configured into PCS cellular base stations. Alternatively, any number of remote units 814, 816, 818, 820, 822, 824 could be configured into a base station for any of the technology or frequency bands described with respect to system 100. Each remote station 802, 804, 806, 808, 810, 812 functions similarly, except that they will vary based on the configuration of their respective remote unit 814, 816, 818, 820, 822, 824.

Distributed base station system 800 has many advantages over traditional centralized base station systems. For example, remote stations 806, 806 which are equipped with a base station do not need to transmit signals back to central node 801 for base station processing. Instead, when an RF signal is received via antenna 826 at remote station 806, for example, remote station 806 processes the RF signal with remote unit 818, which is configured as a base station. Processing the RF signal forms a second RF signal which is then routed toward the destination of the RF signal. In this embodiment, the RF signal received at remote unit 806 is from a first mobile device which is in communication with a second mobile device which is the destination of the second RF signal. In another embodiment, the RF signal is received from a fixed internet user and the destination of the second RF signal is on the internet via IP gateway at central node 801. In this embodiment, the second mobile device is within transmission range of remote station 812. Thus, after processing by remote unit 818 at remote station 806, routers 828 at remote stations 806, 810, 812 route the second RF signal through remote station 810 to remote station 812. Thus, distributed base station system 800 simplifies and speeds up the processing of wireless signals.

In addition, there are many other advantages of a distributed base station system. For example, since each remote station 802, 804, 806, 808, 810, 812 includes a router, a best path is found to the from the origination remote station to the destination remote station. This decreases the latency of communication transmission, and also reduces unnecessary network traffic. In addition, in one embodiment where each remote station 802, 804, 806, 808, 810, 812 is equipped with a base station, each remote station 802, 804, 806, 808, 810, 812 obtains dedicated capacity to the system. Dedicated capacity refers the allocation of an unvarying amount of bandwidth to each remote station 802, 804, 806, 808, 810, 812. For example, in one embodiment, each remote station 802, 804, 806, 808, 810, 812 is allocated 25 Mbps of bandwidth. This is not possible in previous systems, because each remote station shares the capacity of a single central base station.

Figure 9:
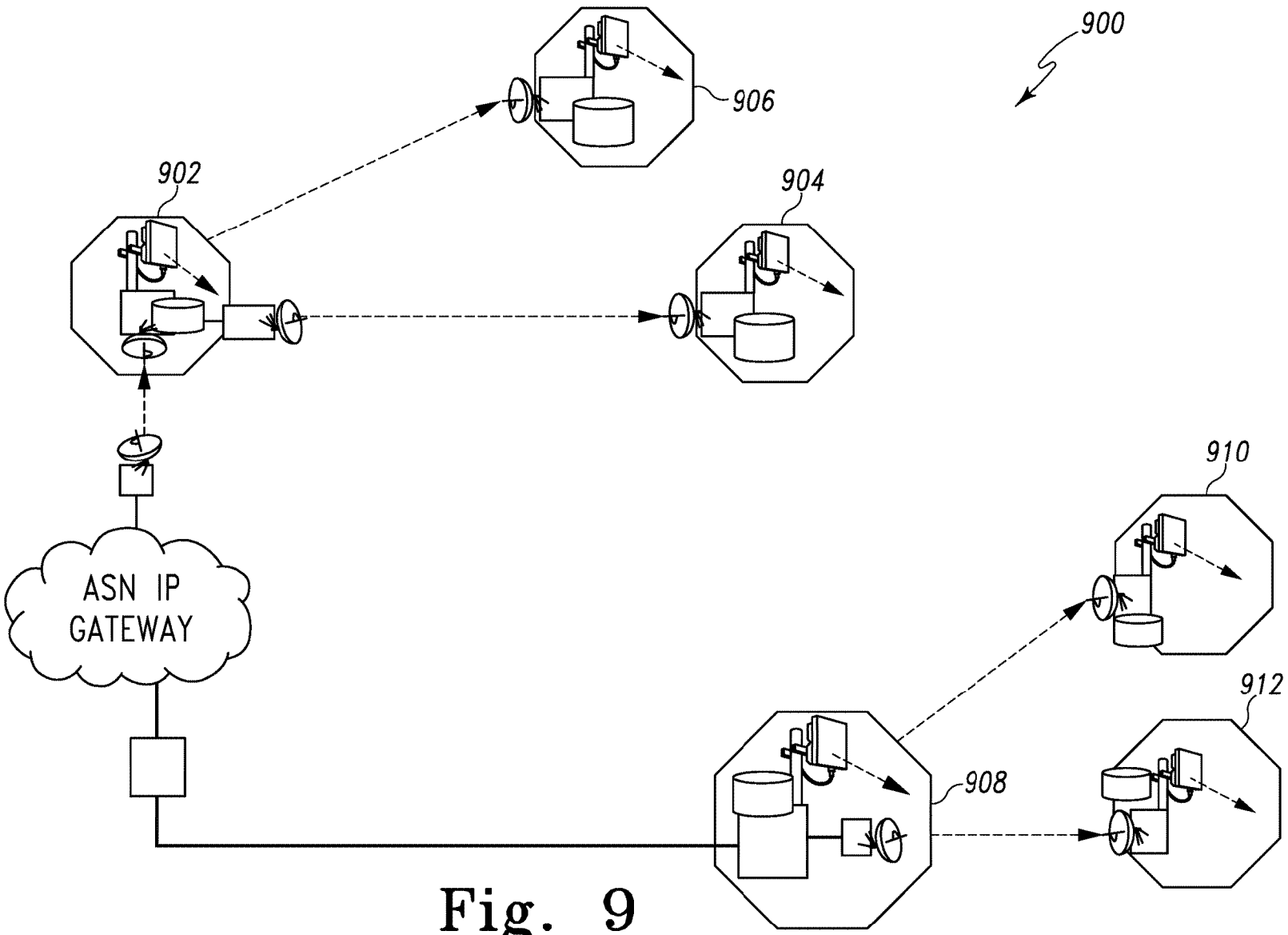
FIG. 9 illustrates another embodiment of a distributed base station system.

In one embodiment, remote stations 802, 804, 806, 808, 810, 812 are set up in a ring configuration as shown in FIG. 8. The ring structure is advantageous, because a ring configuration allows multiple paths to be found to each remote station 802, 804, 806, 808, 810, 812. Thus, there are more options for a best path to be found to each remote device 802, 804, 806, 808, 810, 812, and congested areas are more easily avoided. In another embodiment, shown in FIG. 9, remote stations 902, 904, 906, 908, 910, 912 are arranged into tree configurations. Tree configurations are advantageous, because they reduce the complexity of the network and the amount of communication links that must be established. Tree configurations, however, still provide reduced latencies by allowing signals to be routed through the local hubs (e.g. remote station 902 and 908) and not requiring transmission to central hub 901.

In yet another embodiment, a plurality of remote stations is set up in a daisy chain configuration. Alternatively, any combination of ring, tree, or daisy chain configurations could be used to network a plurality of remote stations.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system, comprising:

a host unit configured to communicate Internet Protocol (IP) data with an IP gateway, wherein the host unit includes:

a baseband processor configured to perform baseband processing to place IP data onto a channel, wherein the baseband processor is configured to convert between IP data and baseband, digital data;

a serial interface configured to convert between baseband, digital data and one or more first serial data streams;

*an RF interface configured to convert between RF signals configured for communication over an antenna and RF sampled data, the RF unit interface comprising a first RF module configured to communicate with a base station using a first frequency band and a second RF module configured to communicate with the base station using a second frequency band;* a remote unit, communicatively coupled to the host unit over a communication medium, the remote unit including:

a serial interface, communicatively coupled to the communication medium, the serial interface configured to convert between one or more first serial data streams and radio frequency (RF) sampled data;

an RF interface, communicatively coupled to the serial interface, the RF interface configured to convert between RF sampled data and one or more RF signals.

2. The system of claim 1, [wherein the host unit further comprises an RF interface configured to convert between RF signals configured for communication over an antenna and RF sampled data,] wherein the serial interface of the host unit is further configured to convert between RF sampled data and one or more second serial data streams, wherein the serial interface of the remote unit is further configured to convert between the one or more second serial data streams and RF sampled data.

[3. The system of claim 2, wherein the RF interface of the host unit includes a first RF module configured to communicate with a base station using a first frequency band and a second RF module configured to communicate with the base station using a second frequency band.]

4. The system of claim 2, wherein the host unit further includes a multiplexer configured to multiplex the one or more first serial data streams and the one or more second serial data streams for concurrent communication over the communication medium; and wherein the remote unit further includes a demultiplexer configured to demultiplex the one or more first serial data streams and the one or more second serial data streams.

5. The system of claim 1, wherein the serial interface of the host unit is further configured to convert between IP data and one or more second serial data streams;

wherein the serial interface of the remote unit is further configured to convert between the one or more second serial data streams and IP data;

wherein the remote unit further includes a second baseband processor, communicatively coupled to the serial interface of the remote unit, wherein the second baseband processor is configured to perform baseband processing to place IP data onto a channel, wherein the second baseband processor is configured to convert between IP data and baseband, digital data;

wherein the serial interface of the remote unit is configured to convert between baseband, digital data and RF sampled data.

6. The system of claim 1, wherein the baseband, digital data corresponds to open base station architecture (OBSAI) protocol data or common public radio interface (CPRI) protocol data.

7. The system of claim 1, wherein the host unit further comprises an interface configured to communicate baseband, digital data with a base station.

8. A host unit comprising:

a baseband processor configured to communicate Internet Protocol (IP) data with an IP gateway, wherein the baseband processor is configured to perform baseband processing to place IP data onto a channel, wherein the baseband processor is configured to convert between IP data and baseband, digital data; and a serial interface configured to convert between baseband, digital data and one or more first serial data streams and communicate the one or more first serial data streams with a communication medium, *wherein the serial interface is configured to convert between IP data and one or more second serial data streams and communicate the one or more second serial data streams with the communication medium.*

9. The host unit of claim 8, further comprising a radio frequency (RF) interface configured to convert between RF signals configured for communication over an antenna and RF sampled data, wherein the serial interface is configured to convert between RF sampled data and one or more second serial data streams and communicate the one or more second serial data streams with the communication medium.

10. The host unit of claim 9, wherein the RF interface includes a first RF module configured to communicate with a base station using a first frequency band and a second RF module configured to communicate with the base station using a second frequency band.

11. The host unit of claim 9, further comprising a multiplexer/demultiplexer configured to multiplex/demultiplex the one or more first serial data streams and the one or more second serial data streams.

[12. The host unit of claim 8, wherein the serial interface is configured to convert between IP data and one or more second serial data streams and communicate the one or more second serial data streams with the communication medium.]

13. The host unit of claim 8, wherein the baseband, digital data corresponds to open base station architecture (OBSAI) protocol data or common public radio interface (CPRI) protocol data.

14. The host unit of claim 8, further comprising an interface configured to communicate baseband, digital data with a base station.

15. A remote unit, comprising:

a radio frequency (RF) interface configured to communicate radio frequency (RF) signals with an antenna and convert between RF signals and RF sampled data;

a serial interface configured to convert between RF sampled data and baseband, digital data;

a baseband processor configured to convert between baseband, digital data and Internet Protocol (IP) data;

wherein the serial interface is configured to convert between IP data and one or more first serial data streams and communicate the one or more first serial data streams with a communication medium.

16. The remote unit of claim 15, wherein the RF interface includes a first RF module configured to communicate with the antenna using a first frequency band and a second RF module configured to communicate with the antenna using a second frequency band.

17. The remote unit of claim 15, wherein the serial interface is further configured to convert between sampled RF data and one or more second serial data streams, wherein the serial interface is further configured to communicate the one or more second serial data streams with the communication medium.

18. The remote unit of claim 17, further comprising a multiplexer/demultiplexer configured to multiplex/demultiplex the one or more first serial data streams and the one or more second serial data streams.

19. The remote unit of claim 17, wherein the baseband, digital data corresponds to open base station architecture (OBSAI) protocol data or common public radio interface (CPRI) protocol data.

20. The remote unit of claim 15, wherein the serial interface is further configured to convert between baseband, digital data and one or more second serial data streams and communicate the one or more second serial data streams with the communication medium.

*21. A system, comprising:*

*a host unit configured to receive Internet Protocol (IP) data, wherein the host unit includes:*

*a baseband unit configured to perform baseband processing to place IP data onto a channel, wherein the baseband unit is configured to convert between IP data and baseband, digital data; and*

*one or more interfaces configured to output one or more antenna data streams comprising the baseband, digital data;*

*wherein the one or more interfaces are configured to output the one or more antenna data streams with destination information;*

*one or more remote units communicatively coupled to the host unit, where each remote unit of the one or more remote units is configured to convert the one or more antenna data streams to one or more RF signals.*

*22. The system of claim 21, wherein the baseband, digital data corresponds to data formatted for a common public radio interface (CPRI) based protocol.*

*23. The system of claim 21, wherein the one or more remote units includes a plurality of remote units.*

*24. The system of claim 23, wherein the host unit is configured to perform splitting and summing for simulcast.*

*25. The system of claim 21, wherein each remote unit of the one or more remote units is configured to transmit the one or more RF signals to mobile devices via an antenna.*

*26. The system of claim 21, wherein each remote unit of the one or more remote units is configured to transmit RF signals to mobile devices using multiple frequency bands.*

*27. The system of claim 21, wherein the host unit further comprises a user interface for alarm, status, or configuration management.*

*28. The system of claim 21, wherein the one or more remote units are communicatively coupled to the host unit with optical fiber.*

*29. The system of claim 21, wherein the one or more interfaces are configured to output the one or more antenna data streams as serial data streams.*

*30. A host unit comprising:*

*a baseband unit configured to receive Internet Protocol (IP) data, wherein the baseband unit is configured to perform baseband processing to place IP data onto a channel, wherein the baseband unit is configured to convert between IP data and baseband, digital data; and*

*one or more interfaces configured to output one or more antenna data streams, wherein the one or more antenna data streams comprise the baseband, digital data;*

*wherein the one or more interfaces are configured to output the one or more antenna data streams with destination information.*

*31. The host unit of claim 30, wherein the baseband, digital data corresponds to data formatted for a common public radio interface (CPRI) based protocol.*

*32. The host unit of claim 30, wherein the one or more interfaces comprise one or more optical interfaces.*

*33. The host unit of claim 30, wherein the one or more interfaces includes a plurality of serial interfaces.*

*34. The host unit of claim 33, wherein the host unit is configured to perform splitting and summing for simulcast.*

*35. The host unit of claim 30, wherein the host unit further comprises a user interface for alarm, status, or configuration management.*

*36. The host unit of claim 30, wherein the one or more interfaces are configured to output the one or more antenna data streams as serial data streams.*

* * * * *